United States Patent [19]

Skalski

[11] Patent Number: 5,617,023
[45] Date of Patent: Apr. 1, 1997

[54] INDUSTRIAL CONTACTLESS POSITION SENSOR

[75] Inventor: Clement A. Skalski, Avon, Conn.

[73] Assignee: Otis Elevator Company, Farmington, Conn.

[21] Appl. No.: 382,775

[22] Filed: Feb. 2, 1995

[51] Int. Cl.⁶ ............................................. G01B 7/14
[52] U.S. Cl. ................................................. 324/207.17
[58] Field of Search ........................ 324/207.17, 207.13, 324/207.2, 207.21, 207.24, 207.25, 207.26, 251, 252, 207.18, 207.16, 207.15; 338/32 R, 32 H

[56] References Cited

U.S. PATENT DOCUMENTS

| | | |
|---|---|---|
| 3,079,545 | 2/1963 | Kretsch et al. . |
| 3,205,485 | 9/1965 | Noltingk . |
| 3,336,525 | 8/1967 | Church . |
| 3,849,724 | 11/1974 | Ghibu et al. ............... 324/207.26 |
| 3,890,516 | 6/1975 | Widdowson et al. . |
| 3,961,243 | 6/1976 | Schulz . |
| 4,387,339 | 6/1983 | Åkerblom . |
| 4,447,743 | 5/1984 | Bean et al. ................ 324/207.26 |
| 4,560,930 | 12/1985 | Kouno ........................ 324/207.17 |
| 4,570,118 | 2/1986 | Tomczak et al. ............ 324/207.2 |
| 4,591,795 | 5/1986 | McCorkle . |
| 4,649,340 | 3/1987 | Zabler . |
| 4,651,130 | 3/1987 | Pennell . |
| 4,717,874 | 1/1988 | Ichikawa et al. ........... 324/207.18 |
| 4,752,732 | 6/1988 | Van Schoiack et al. ..... 324/207.18 |
| 4,754,849 | 7/1988 | Ando . |
| 4,774,465 | 9/1988 | Nilius ........................ 324/207.18 |
| 4,800,978 | 1/1989 | Wasa et al. ................ 324/207.18 |
| 4,816,759 | 3/1989 | Ames et al. . |
| 4,904,921 | 2/1990 | DeVito et al. . |
| 4,982,156 | 1/1991 | Lewis et al. . |
| 5,047,715 | 9/1991 | Morgenstern ............... 324/207.26 |
| 5,294,757 | 3/1994 | Skalski et al. . |
| 5,300,884 | 4/1994 | Maestre ..................... 324/207.25 |
| 5,329,077 | 7/1994 | Skalski et al. . |
| 5,339,030 | 8/1994 | Hayashi .................... 324/207.25 |
| 5,373,123 | 12/1994 | Skalski . |

FOREIGN PATENT DOCUMENTS 1079894  8/1967  United Kingdom .

OTHER PUBLICATIONS

A Linear Output Hall Effect Transducer for Automotive Systems, Norman Wheelock, SAE Tech. Paper Series No. 810379, pp. 23–27, Feb., 1981.

Primary Examiner—Sandra L. O'Shea
Assistant Examiner—Roger Phillips
Attorney, Agent, or Firm—Francis J. Maguire, Jr.

[57] ABSTRACT

A contactless position sensor uses at least a first magnetic flux source on one side of an object, wherein a sensor is responsive to the flux, for providing a sensed signal indicative of varying positions (x) of the first magnetic flux source and the object relative to each other, including a null position (g), wherein the sensed signal is related to the null position and the varying positions according to a relation $(1/(g+x))-(1/(g-x))$. An additional magnetic flux source can be provided on the other side of the object for providing additional flux sensed by the sensing means, wherein the first and second magnetic flux sources can be arranged to move in unison with respect to the object, or can be stationary while the object moves between them. The second flux source can be made stationary and its flux directed to either the object or to a second object with a fixed distance therebetween. Or, the second flux source can be dispensed with entirely and simulated by a bias signal. The flux sources can be cores with coils wound thereon having the shape of a pot or an E. The sources can be permanent magnets. A simple signal processing technique for linearizing the output can be used in most cases and comprises a simple divider. Certain sensors can even be used without needing a divider in a certain limited linear range.

9 Claims, 26 Drawing Sheets

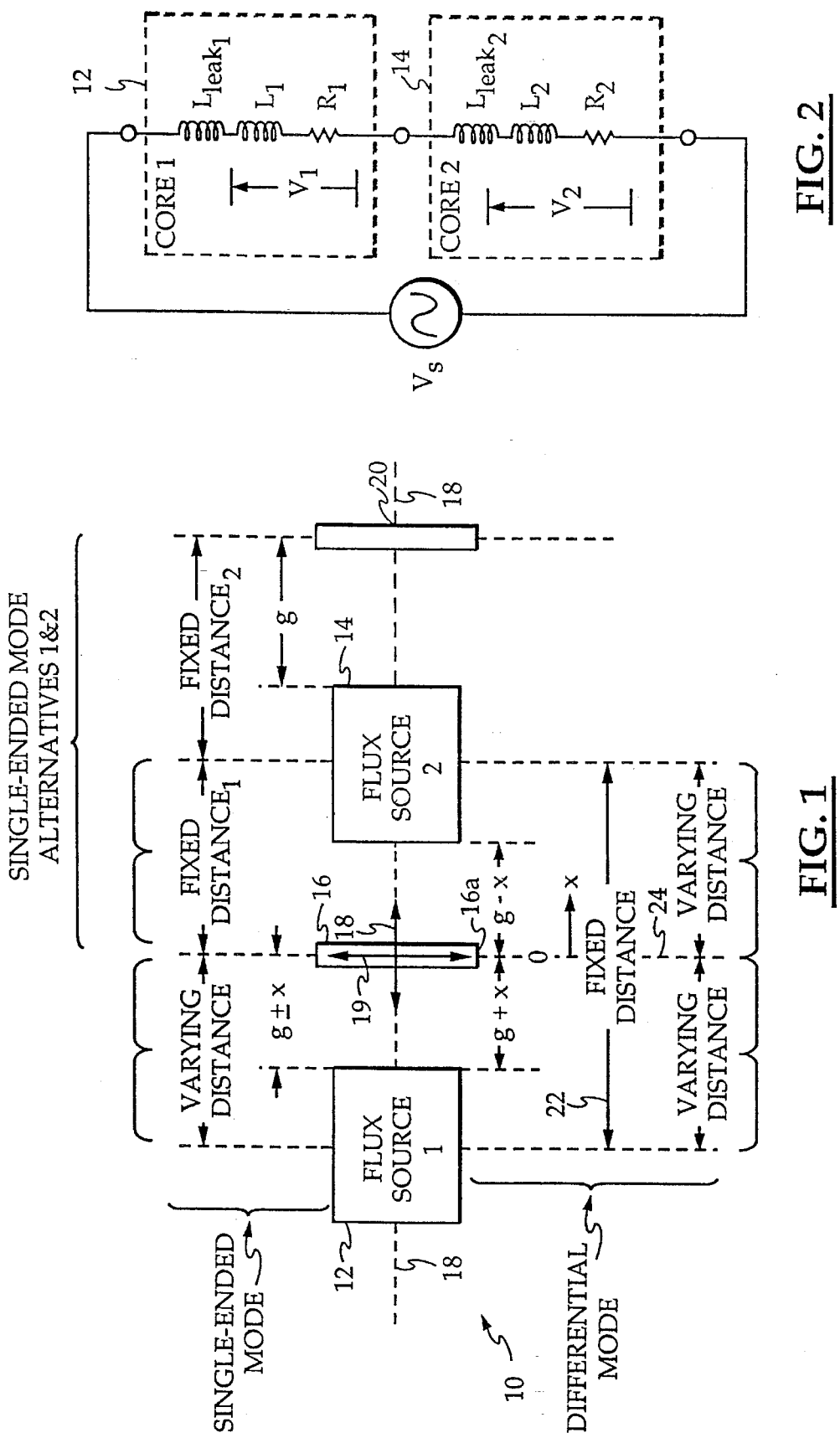

```
1   %sensor5.m
    %E core
    %analysis of position sensor using differential transformer
    % comparison with experiment
5   % poor design can be studied
    clear
    clg
    A=233.03e-6; %effective area of core (m^2)
    Vs=10;  % rms supply voltage
10  fo=2500; %  freq of oscillator
    wo=2*pi*fo;
    go= 12e-3; % nominal gap (m)
    %
    N_nom=1000; % nominal turns
15  fraction=0;  % fractional errors on turns, resistance
    DELN=N_nom*fraction;
    N=N_nom-DELN/2;
    R1_nom=150;
    DELR1=R1_nom*fraction;
20  R1=R1_nom-DELR1/2; %resistance of coil1 (effective resistance incl
    uding source)
    %
    %
    uo=pi*4e-7;
25  const=uo*A/2;
    Lo=N^2*const/go; % nominal inductance (H)
    Lleak=5*Lo; %leakage inductance
    delg=-.95*go:1e-4:.95*go;
    oneg=ones(size(delg));
30  g1=go*oneg+delg;
    L1=Lleak*oneg+N^2*const./ (g1);
    g2=go*oneg-delg;
    L2=Lleak*oneg+(N+DELN)^2*const./ (g2);
    XL1=wo*L1;
35  XL2=wo*L2;
    Z1=j*XL1+R1*oneg;
    Z2=j*XL2+(R1+DELR1)*oneg;
    Zpri=Z1+Z2;
    I=Vs*(1./(Z1+Z2));
40  %
    Vout=j*I.*(-XL1+XL2) ;
    delg=delg*1000;
    %
    % copy data from Hank10
45  %HANK10.M
    %S/S SENSOR 2.5 KC/S SCHAEVITZ AMP
    %1000 TURN COILS E FORM
    %2 RAILS EACH 12MM FROM THE COILS
```

FIG. 9A

```
                %DATA TAKEN IN 1MM INCREMENTS
50      DATA=[...
           11    10.3
           10    6.72
            9    4.76
            8    3.61
55          7    2.55
            6    2.01
            5    1.43
            4    1.09
            3     .76
60          2     .49
            1     .25
            0     .01
           -1   - .21
           -2   - .49
65         -3   - .73
           -4   -1.14
           -5   -1.51
           -6   -2.10
           -7   -2.80
70         -8   -3.69
           -9   -5.20
          -10   -6.85
          -11  -10.35];
        %PROCESS AND PLOT DATA
75      X1=DATA(:,1);
        DATA1=DATA(:,2);
        %FIX OFFSETS
        Y1=INTERP1(X1,DATA1,0);
        DATA1=DATA1-Y1;
80      %X11=INTERP1(DATA1,X1,0);
        %X1=X1-X11;

%plot(X1,DATA1)
        %TITLE('E-CORE NON-CONTACT POSITION SENSOR RESPONSE')
        %XLABEL('DISPLACEMENT (MM)')
85      %YLABEL('OUTPUT (V)')
        %scale Vout to match experiment
        scale=2
        Vout=scale*Vout;
        %plot(delg, abs(Vout), '- -', delg, real(Vout), delg, imag(Vout), ' - . ', X1,
90      DATA1, '*')
        plot(delg, real(Vout), X1, DATA1, '*')
        title('Calculated and Experimental (*) Output Signals vs. Displace
        ment')
        grid
```

FIG. 9B

```
 95  xlabel('DISPLACEMENT (mm)')
     ylabel('OUTPUT (V)')
     tx1=sprintf('fo(Hz) , go(mm) , Lo(mH) , Lleak(mH) = %8.2f%8.2f%8.2f%8
     .2f' , fo , go*1000 , Lo*1000 , Lleak*1000);
     gtext(tx1);
100  tx2=sprintf('COIL1 (T) , COIL2 (T) = %8.2f%8.2f' , N , N+DELN);
     gtext(tx2);
     tx3=sprintf('R1_coil1 (0) , R_coil2 (0)= %8.2f%8.2f' , R1 , R1+DELR1);
     gtext(tx3);
     tx4=sprintf('A(mm^2) , Vs(V) , scale = %8.2f%8.2f%8.2f' , A*1e+6, Vs , scal
105  e);
     gtext (tx4);
     gtext('calculated data scaled to match test data')

pause
     figure(2)
110  plot(delg, abs(Zpri))
     title('Load Impedance Magnitude Seen by Oscillator')
     xlabel('DISPLACEMENT (mm)')
     ylabel('|Z| (Ohm) ')
     grid
```

FIG. 9C

```
     plot (x1 , data1 , x1b , data1 , '--' );
     title ( ' E-Core Position Sensor Response ; ---- computed - 12 mm Nomi
 50  nal Gap ' )
     xlabel ( ' Displacement x (mm) ' )
     ylabel ( ' Output y (V) ' )
     grid
     gtext ( ' one-sided operation -- one coil is fixed ' );
 55  gtext ( 'y=Ko + K1/(xo - x) ' ) ;
     gtext ( 'x=xo - K1/(y -Ko) ' ) ;
     gtext ( ' K1=yi * xo * (xo - xi) /xi   Ko = -K1/xo ' ) ;
```

FIG. 15B

```
1   %sensor6.m
    %E core
    %analysis of position sensor using single transformer
    % comparison with experiment
5   % poor design can be studied
    clear
    clg
    A=233.03e-6; %effective area of core  (m^2)
    Vs=10; % rms supply voltage
10  fo=2500; % freq of oscillator
    wo=2*pi*fo ;
    go= 12e-3; % nominal gap (m)
    %
    N_nom=1000 ; % nominal turns
15  fraction=0 ; % fractional error on turns, resistance
    DELN=N_nom*fraction;
    N=N_nom-DELN/2;
    R1_nom=150;
    DELR1=R1_nom*fraction;
20  R1=R1_nom-DELR1/2; % resistance of coil1 (effective resistance incl
    uding source)
    %
    %
    uo=pi*4e-7;
25  const=uo*A/2;
    Lo=N^2*const/go; % nominal inductance (H)
    Lleak=4*Lo; % leakage inductance
    delg=-.95*go:1e-4:.95*go;
    oneg=ones(size(delg));
30  g1=go*oneg-delg;
    L1=Lleak*oneg+N^2*const./(g1);
    g2=go*oneg;
    L2=Lleak*oneg+(N+DELN)^2*const./(g2);
    XL1=wo*L1;
35  XL2=wo*L2;
    Z1=j*XL1+R1*oneg;
    Z2=j*XL2+(R1+DELR1)*oneg;
    Zpri=Z1+Z2;
    I=Vs*(1./(Z1+Z2));
40  %
    Vout=j*I.*(XL1-XL2);
    delg=delg*1000;
    %
    %
45  %copy data from Clem12.m
    %7-22-94, schavetz amp @ 2.5kc/s
    %two rails each 12mm from coil and one rail is FIXED
```

FIG. 12A

```
                    % displacement voltage output
                    % s/s test data 1000 turn coils.
50          data=[ ...
            11    11.33
            10    8.09
             9    5.06
             8    3.72
55           7    2.59
             6    1.79
             5    1.32
             4     .83
             3     .59
60           2     .31
             1     .15
             0     .00
            -1    -.11
            -2    -.19
65          -3    -.27
            -4    -.32
            -5    -.37
            -6    -.40
            -7    -.43
70          -8    -.46
            -9    -.48
           -10    -.50
           -11    -.51];
            %process and plot data
75          x1=data(:,1);
            data1=data(:,2);
            %fix offsets
            y1=interp1(x1,data1,0);
            data1=data1-y1;
80          x11=interp1(data1,x1,0);
            x1=x1-x11;
            %
            %alternate fit to data
            %out=Ko+K1/(xo-x)  x=xo-K1/(out-Ko)  Ko=-K1/xo  K1=y*(xo-x)*xo/x
85          xo=12;
            %(x1,y1) defines point on measured curve
            xi=6.35;
            yi=2;
            K1=yi*(xo-xi)*xo/xi;
90          Ko=K1/xo;
            x1b=data1./(ones(size(data1)) + xo*data1);
            x1b=xo*ones(size(data1))-K1./(data1-Ko*ones(size(data1)));
            %plot(x1,data1,x1b,data1);
            %plot(x1b,data1);
```

FIG. 12B

```
 95   %title( 'E-Core Non-Contact Position Sensor Response - 12 mm Nomina
      l Gap')
      %xlabel ('Displacement (mm) ' )
      %ylabel ('Output (V) ' )
      %grid
100   %gtext ( 'one-sided operation - - one coil is fixed ' )

scale=2
      Vout=scale*Vout;
      %plot (delg, abs(Vout ) , ' - - ' , delg , real(Vout) , delg, imag(Vout), ' - . ' , X1 ,
      DATA1, ' * ')
105   plot (delg, real (Vout), x1, data1, ' * ' )
      title( 'Calculated and Experimental (*) Output Signals vs. Displace
      ment')
      grid
      xlabel('DISPLACEMENT (mm)')
110   ylabel('OUTPUT (V)')
      tx1=sprintf('fo(Hz), go(mm), Lo(mH), Lleak(mH) = %8.2f%8.2f%8.2f%8
      .2f', fo, go*1000, Lo*1000, Lleak*1000);
      gtext(tx1);
      tx2=sprintf('COIL1 (T), COIL2 (T) = %8.2f%8.2f', N, N+DELN);
115   gtext(tx2);
      tx3=sprintf('R1_coil1 (0), R_coil2 (0) = %8.2f%8.2f', R1, R1+DELR1);
      gtext(tx3);
      tx4=sprintf('A(mm^2), Vs(V), scale = %8.2f%8.2f%8.2f', A*1e+6, Vs, scal
      e);
120   gtext(tx4);
      gtext('calculated data scaled to match test data')

pause
      figure(2)
      plot(delg, abs(Zpri))
125   title('Load Impedance Magnitude Seen by Oscillator')
      xlabel('DISPLACEMENT (mm)')
      ylabel('I Z I (Ohm)')
      grid
```

FIG. 12C

```
% clem12.m
%         Schaevetz amp @ 2.5kc/s
%two rails each 12mm from coil      one rail is FIXED
%diplacement voltage output
%s/s test data  1000 turn coils.
data=[ ...
11    11.33
10     8.09
 9     5.06
 8     3.72
 7     2.59
 6     1.79
 5     1.32
 4      .83
 3      .59
 2      .31
 1      .15
 0      .00
-1     -.11
-2     -.19
-3     -.27
-4     -.32
-5     -.37
-6     -.40
-7     -.43
-8     -.46
-9     -.48
-10    -.50
-11    -.51];
%process and plot data
x1=data(:,1);
data1=data(:,2);
%fix offsets
y1=interp1(x1, data1, 0);
data1=data1-y1;
x11=interp1 (data1, x1, 0);
x1=x1-x11;
%
%fit equation to data
%out=Ko+K1/(xo-x) x=xo-K1/(out-Ko) Ko=-K1/xo K1=y*(xo-x)*xo/x
xo=12;
%(x1, y1) defines point on measured curve
xi=6.35;
yi=2;
K1=yi*(xo-xi)*xo/xi;
Ko= -K1/xo;
x1b=xo*ones(size(data1))-K1./ (data1-Ko*ones(size(data1)));
```

FIG. 15A

INDUSTRIAL CONTACTLESS POSITION SENSOR

Technical Field

This invention relates to contactless position sensing and, more particularly, to magnetic contactless position sensing for industrial purposes.

BACKGROUND OF THE INVENTION

Sensors for the measurement of position/displacement/proximity, may use resistive, capacitive, inductive or optical methods. Position/displacement sensors measure the linear or angular position and are typically connected mechanically between the point or object being sensed and a reference or fixed point or object.

Variable resistors use a mechanical linkage to connect the point or object being sensed to a wiper or moveable arm that slides over the resistance element. Capacitor sensors are generally used for linear rather than angular measurements wherein the dielectric or one of the capacitor plates is connected to the point or object that is moved for displacement measurement. A non-contacting capacitive position sensor is illustrated in Skalski, "Capacitance Distance Transducer," *Proceedings of the IEEE*, Vol. 56, No. 1, January 1968, pp. 111–112.

Inductive sensors may comprise single-coil units which use a change in the self-inductance of the coil or multiple-coil units which rely on the change in magnetic coupling or reluctance between coils. Single-coil displacement sensors use a moveable core connected to the measured object to change the self-inductance whereas single-coil proximity sensors use the magnetic properties of the object itself to modify the self-inductance. The change in inductance is usually sensed with an oscillator-driven bridge circuit.

Multiple-coil inductive sensors typically comprise the differential transformer and its variations. The linear variable differential transformer (LVDT) uses three windings and moveable core to sense linear displacement. A typical LVDT has a moveable core which is coaxial with the windings of both an AC input coil and secondary windings on either side thereof. The secondaries are wound to produce opposing voltages and are connected in series. With the core in a neutral or zero position, voltages induced in the secondary windings are equal and opposite and the net output is a minimum. Displacement of the core increases the magnetic coupling between the primary coil and one of the secondary coils and decreases the coupling between the primary coil and the other secondary coil. The net voltage increases as the core is moved away from the center position and the phase angle increases or decreases as a function of the direction in which the core is moved.

A demodulator circuit can be used to produce a DC output from this winding configuration. Differential transformers are also available for angular measurement in which the core rotates about a fixed axis.

The output from such a displacement sensor may be an analog or digital function of the absolute distance being sensed or it may be a function of the distance from a given starting point. U.S. Pat. No. 4,651,130 shows how to inexpensively convert analog-sensed information from an LVDT or RVDT into digital form. Sometimes there is a requirement to measure linear or angular motion without any mechanical linkage, however.

In terms of technical and economic requirements, potentiometer transducers are simple to apply and can be used with very high output levels, e.g., 50 V or higher and for displacements up to half a meter or from 5° to 3600° but must be mechanically linked to the object or point to be measured. Reluctive transducers, on the other hand, with DC-to-DC conversion circuitry offer displacements between 0.25 millimeter and 3 meter and between 0.05° and 90° and do not necessarily have to be mechanically linked to the object being measured. In AC systems multiple-coil inductive sensors are used more than all others.

UK Pat. Spec. No. 1079894 discloses a proximity detection device for an elevator cage. The device includes induction coils $N_1$, $N_2$ and $N_3$ mounted on the cage to sense magnetic shield plates B mounted at strategic locations in the elevator shaft. See FIGS. 1–3d and lines 29–58 of page 3.

A displacement sensor example is shown in U.S. Pat. No. 3,205,485 to Noltingk which, however, discloses relative transverse movement only (constant gap) between a magnetic or non-magnetic tapered screening vane (A) attached to a slide (c) object and one or more primary/secondary pairs(s) which may use pot-shaped cores with an inductance of about 1 mH and having outside dimensions of about 16 mm with a central portion 6 mm in diameter having 200 turns, with the primary coil excited with 8 volts at 24 kHz with the signal across the secondary coils about 0.68 volt/mm movement of the screen.

In Noltingk, the screen moves perpendicularly to the axis of the primary/secondary. The obtruding of the screen to a greater or lesser extent into the field between the output and pickup coil alters the magnitude of the signal induced in the pickup coil. The disclosure points out that this is distinct from the movement of a ferromagnetic member in the field of an inductance, where the latter operates primarily to reduce the reluctance of one or more magnetic circuits, and its presence increases the flux linking two or more inductances. When a screen is interposed between two inductances, on the other hand, their coupling is reduced because of the magnetic shunting effect, and also as a consequence of the field set up by the currents induced in the screen opposing the field generated by that inductance through which a current is passed. In Noltingk, as in Schulz, there is no disclosure of movement of the screen along the primary/secondary axis. Noltingk shows that either the coil assembly or the screen can be stationary, while the other moves.

In the Noltingk patent, the difference between the prior art and the method disclosed by Noltingk is shown by the fact that with the Noltingk invention, a non-ferromagnetic member can be used as a screen and which approach, has been found to increase sensitivity considerably. The inventor claims sensitivity of 10,000:1.

Another contact method is shown in Zabler (U.S. Pat. No. 4,649,340) where a magnetic differential position sensor is illustrated with coil windings in FIG. 4a on the outer arms of an E-shaped core arrangement, while FIGS. 5a and 6 show primary windings on the outer arms and a sensing winding on the inner arm of the E-shaped core. The coils can slide along the arms and are attached to the object being measured. See column 6, lines 5–19 and lines 39–60. Lines 61–68 of column 6 of Zabler (U.S. Pat. No. 4,649,340) suggest moving the core element instead of the object.

A non-contact method is shown in Widdowson et al (U.S. Pat. No. 3,890,516) where the use of E-cores is illustrated with coil windings that sense the position of non-magnetic conductive areas of a track on a rotating drum to provide timing pulses for engine ignition. The windings 24 and 25 on core 22, as shown in FIG. 2, produce an output signal that is processed by the circuitry of FIGS. 1 and 4. The gap between the rotating drum and E-cores is constant.

U.S. Pat. No. 3,961,243 to Schulz shows another non-contact magnetic sensor, in FIG. 2, U-shaped magnetic cores 11 and 12, with windings on one of the legs, between which a movable magnetic armature 10 is disposed for axial movement therebetween. Transverse movement is not disclosed. See column 3, lines 22–30. FIG. 4 again shows only axial movement of a core within a pair of coaxial coils.

Ando (U.S. Pat. No. 4,754,849) shows non-contacting gap detectors 33, 34 and 35 mounted on an elevator passenger cage for gap control purposes. The detectors may be of the electromagnetic type. See FIGS. 5–8 and column 3, lines 18–22. Presumably, due to side-to-side and front-to-back movements of the elevator car, the detectors can move in both dimensions of the illustrated plane with respect to the hoistway rail, as well as vertically.

U.S. Pat. No. 5,294,757 to Skalski et al shows a one-dimensional non-contacting sensor and shows in FIG. 43a a pair of position sensors 1376, 1378, responsive to the position (POS) of the cab shown in FIG. 44, one sensor of which has a response as shown in FIG. 45, and the combination of which forms the composite response of FIG. 46.

U.S. Pat. No. 5,329,077 to Skalski et al discloses an elevator control system which utilizes sensors for storing horizontal deviation of the rail's surface. FIGS. 8 and 9 include GAP sensors 158 and 162. See column 6, lines 10–41. In column 7, lines 1–17, the use of an LVDT or two separate LVDTs is suggested.

When a differential transducer is used it is important to maintain a constant scale factor throughout the range and under differing conditions. For instance, U.S. Pat. No 3,079,545 discloses an LVDT measurement device that is stabilized against various circuit variations, such as temperature, frequency changes, etc., by comparing the sum of the secondary voltages, which theoretically should be constant to a stable reference signal source, and using any error obtained in the comparison to change the excitation of the primary, thereby creating a feedback loop for keeping the excitation as seen by the secondaries constant. There is a showing of a coaxial arrangement of the secondaries and primary. The physical nature of the primary and secondary windings is not disclosed and may be assumed to be conventional.

U.S. Pat. No. 4,904,921 to DeVito et al shows an LVDT position transducer which includes an interface circuit for producing an output signal that is representative of the difference of the secondary winding signals divided by their sums. See column 3, lines 1–10. This equation computes the movable core position. However, it seems to imply the scale factor is constant, although it also states that the decoder provides excellent scale factor stability and linearity and is relatively insensitive to variations in primary drive amplitude. This may mean that the scale factor K may be assumed to be constant, which assumption may be valid, given the claimed excellent stability thereof.

FIG. 2 of U.S. Pat. No. 4,982,156 to Lewis et al shows an E-shaped core 74 for an RVDT displacement transducer. See column 3, lines 14–30. A CPU 70 calculates the position using a ratio (A−B)/(A+B). See column 4, lines 50–53.

U.S. Pat. No. 4,591,795 to McCorkle shows a ratiometric technique in a LVDT or RVDT, but only operating in a unipolar mode.

U.S. Pat. No. 4,387,339 to Akerblom discusses (column 1, lines 12–20) measurement of the space between two discs of magnetic material by measuring the reluctance in an electrical circuit by means of an inductive position indicator disposed in one of the discs. This method had the problem of iron losses causing temperature dependence, etc. The invention provides a feedback circuit that zeroes a measuring element 30 on a central core of an E or pot-shaped sensor 14 by changing the current to the coils 22, 24 on either side of the measuring element. A measure of the spacing between a surface 10 and a surface 12 is thereby provided. A measuring device 36 measures the difference between the current generators 34, 28.

U.S. Pat. No. 3,336,525 to Church shows a two-coil embodiment of a pressure transducer in FIG. 2 with a non-magnetic diaphragm in between two coils 36, 38 in respective pressure chambers. A differential pressure between the chambers causes the diaphragm to move closer to one of the coils, thereby increasing eddy current losses in that coil. The coils are wired into a balanced bridge, so that this eddy-current difference can be picked up and translated into pressure differential by way of the positional change of the diaphragm. FIGS. 12 and 14–16 show a single sensor head 80 embodiment where the two coils 82, 84 are in the same head and wired in a bridge circuit shown in FIG. 17 for sensing the distance between the sensor head 80 and a plate 109. FIG. 18 shows the result in curve No. 3, which has a linear range, as shown.

DISCLOSURE OF INVENTION

An object of the current invention is to provide a contactless position sensor.

Another object of the present invention is to provide a contactless position sensor having a nonlinear output that can nonetheless be linearized with a very simple signal processing technique while at the same time obtaining good accuracy.

Still another object of the current invention is to provide a contactless position sensor for measuring the relative position of a flux source with respect to an object or position wherein the source and object or position are capable of moving in at least two dimensions with respect to each other.

Yet another object of the current invention is to provide a contactless position sensor that operates in a hybrid eddy-current/reluctance mode that is not sensitive to the operational apportionment of eddy-current mode to reluctance mode.

Still another object of the present invention is to provide a system that can operate using either magnetic material or nonmagnetic material as the sensed object or position.

A further object of the present invention is to provide a contactless position sensor that can operate in a low-frequency range, and it has virtually the same response in that range.

Yet another object of the present invention is to improve performance over known sensors and at lower cost.

Still another object of the present invention is to provide a contactless position sensor that is inherently smaller than prior art sensors.

According to the invention, a contactless position sensor comprises at least a first magnetic flux source for providing magnetic flux along an axis of the sensor, an object for receiving the magnetic flux on a first side thereof, and sensing means, responsive to the magnetic flux for providing a sensed signal indicative of varying positions of the first magnetic flux source and said object relative to each other, including a null position, wherein the sensed signal is related to the null position and the varying positions according to a relation $(1/(g+x)-(1/(g-x))$.

In further accord with the invention, the sensor further comprises a second magnetic flux source on a second, opposite side of the object, for providing additional magnetic flux along the axis, wherein the object is for receiving the additional magnetic flux, and wherein the sensing means is responsive to the additional magnetic flux for providing the sensed signal indicative of varying positions of the object and the first and second flux sources relative to each other.

In still further accord with the invention, a distance between the object and the second magnetic flux source is fixed.

According further to the invention, in lieu of a second magnetic flux source, a bias signal is provided for summation with the sensed signal.

In further accord with the invention, the first and second magnetic flux sources each comprise a driven coil wound on a core for being excited by a sinusoidal electrical source for providing the magnetic flux, and wherein the sensing means comprises a sensing coil wound on each core. Such sensing coils may be wound in opposition and connected in series to provide an output signal indicative of the difference in flux on the opposite sides of the object.

In still further accord with the invention, a signal processing means is responsive to the sensed signal for providing a position signal. The signal processing means, according to the invention, can take the form of a simple divider or, at most, the form of the solution of a quadratic.

According still further to the invention, the first magnetic flux source comprises a permanent magnet, and the sensing means is a magnetic flux sensor attached to the object. Similarly, both the first and second magnetic flux sources may be permanent magnets.

According still further to the invention, for magnetic flux sources excited by a sinusoidal source, the cores can take the form of an E or a pot. These and other objects, features and advantages of the present invention will become more apparent in light of the following detailed description of a best mode embodiment thereof, as illustrated in the accompanying drawing.

BRIEF DESCRIPTION OF THE DRAWING

FIG. 1 shows a contactless position sensor which can be carried out for use in a differential mode or a single-ended mode, according to the invention.

FIG. 2 shows an equivalent circuit for analysis of both differential and single-ended position sensors, according to the invention.

FIGS. 9A–9C comprise a MATLAB listing showing the constants relied upon and the computations for plotting the displacement vs. output voltage curve of FIG. 8 and the displacement vs. load impedance curve of FIG. 10, according to the invention.

FIGS. 12A–12C are analogous to FIGS. 9A–9C for a single-ended sensor system, according to the invention.

FIGS. 15A–15B show a MATLAB code used to generate FIG. 14 using assumptions similar to those used in Figs. 9A–9C and 12A–12C, according to the invention.

BEST MODE FOR CARRYING OUT THE INVENTION

Figure 3:
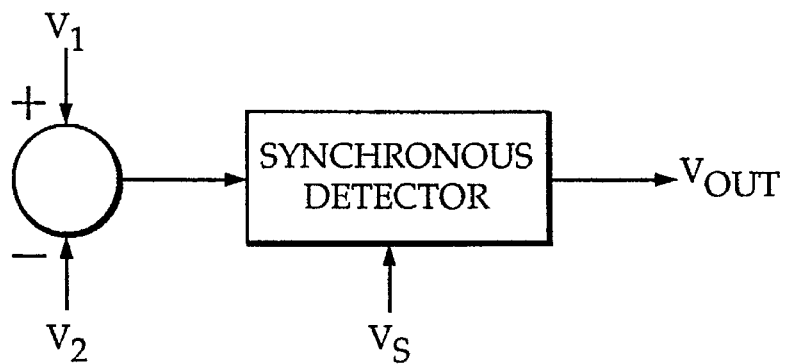
FIG. 3 is a simplified block diagram showing a technique which may be used to process the voltages shown in FIG. 2, according to the invention.

FIG. 1 shows a contactless position sensor 10, according to the invention, using magnetic flux sources 12, 14 for providing flux that is used for sensing the position of the sources 12, 14 with respect to an object 16 or for sensing the position of the object 16 itself along an axis 18. The object may be a plate, as shown, which can be ferromagnetic or not. In that case, a plane 19 may be defined corresponding to a null position. The flux sources 12, 14 may each be primary coils driven by an AC source and may include secondary coils for sensing the flux. Or, they may be permanent magnets. In that case, the object 16 may be a thin rod or finger extending between the sources 12, 14 along a line in the plane 19 for mounting a sensor, such as a Hall cell, e.g., at the end thereof. According further to the invention, the object 16 may also be free to move within a selected range along an axis in the plane 19, i.e., perpendicular to the axis 18 or one parallel thereto.

On the other hand, the object 16 can be stationary, and one or both of the sources 12, 14 movable with respect thereto. Even if the sources are capable of moving in the direction of an axis perpendicular to the line 18, the magnetic flux sources will still be sensing the position of the object with respect to the sources along an axis parallel to the axis 18. In other words, at least one of the sources should be free to move along the axis 18 or one parallel thereto, if the sources are free to move in a direction perpendicular to the axis 18.

It is even possible for the position sensor 10 of FIG. 1 to measure the relative position between the object 16 and the flux sources 12, 14, with both the object and the flux sources being movable. It should therefore be understood that the contactless position sensor 10 of FIG. 1 can be used as a relative displacement sensor. This is also true when used in a single-ended mode, to be described below.

In a differential mode the flux sources 12, 14 may be positioned on opposite sides of the object 16 with a fixed distance 22 therebetween and having a centered or zero position 24 with varying distances g+x and g−x between each source and the object. For a case where the object is stationary, the sources may be designed to move in unison and will have at least a component of motion in one direction or the other along the axis 18 (or one parallel thereto) so that when the source 12 is moved to the left, source 14 is closer to the object by a measurable distance while at the same time source 12 is further away by that same measurable distance. Similarly, the sources may be stationary and the object 16 moveable with at least a component of motion along the axis 18. In both cases, relative motion between the object and the sources in a direction perpendicular to the axis 18 may be permitted. In some applications, for instance an elevator application where the object 16 can be a stationary vertical hoistway rail and the sources are mounted on the car for horizontal motion with respect to the rail, relative motion in yet another orthogonal (vertical) direction is permitted.

In a single-ended mode, according to the invention, the flux sources 12, 14 may be positioned differently. For instance, in the elevator application where coils wound on cores may serve as the flux sources, instead of facing the rail 16, the core 12 may be positioned as shown or may be positioned to sense an end of the rail 16. For a "side-to-side" positional measurement, the core 12 will be mounted on the side of the elevator car, positioned close to a distal end 16a of the blade of the rail 16. In that case, the core would still be wired into a measurement circuit and be mounted on the car, but a fixed distance would be maintained between core 14 and another plate 20, which would also be mounted on the car and a fixed distance would be maintained between the core 14 and the plate 20. Such a fixed distance (2) may be selected to result in a nominal gap (g) being maintained between source 14 and plate 20. The other core 12 in that case has a varying distance between itself and the rail which is the subject of the measurement. On the other hand, for other applications, a stationary relationship between core 14 and object 16 can be set up as shown by a fixed distance (1). In other words, the source 14 need not be strictly associated with the same object 16 as is the source 12 for this single-ended mode of operation and the sources need not be oriented exactly as shown.

As mentioned above, it should be fully realized that for the single-ended mode or the differential mode, the object 16 can be stationary and the varying distance or distances manifested by movement of the source or sources. Similarly, the source or sources may be stationary and the object 16 may be moveable therebetween. Or, both the object and the source or sources may all be moveable. In other words, the various fixed and varying distances illustrated in FIG. 1 only illustrate the relationships between the sources and object and do not necessarily imply that any of them are stationary or fixed with respect to any outside objects (not shown). It should be realized that such conditions depend on the specific application and it is the relationships illustrated that are important here.

FIG. 2 shows an equivalent circuit for analysis of both differential and single-ended position sensors. The analysis assumes the flux sources are coils wound on cores driven by a sinusoidal voltage source $V_S$. The frequency of $V_S$ may be a low frequency, e.g., on the order of 2.5 kilohertz or lower and is such for all of the systems considered. It should be realized that it can be used for higher frequencies, e.g., without limitation, up to about 10 kilohertz under the assumptions for a reluctive sensor disclosed herein with no difficulty. It should be realized that higher frequencies are permissible, however, moreover, when used in an eddy-current mode, frequencies on the order of 100 kHz or possibly even up to 1 MHz are possible.

The inductances L1 and L2 are the airgap inductances in the gaps "g+x" and "g−x" (or "g" for the single-ended mode)

of inductive elements used in the cores 12, 14. The airgap inductances relate to magnetic flux that passes from the cores to the reaction plate 16 or plates 16, 20. These inductances vary inversely with the gap. $L_{leak}$ is the leakage inductance attributed to each core element. The leakage inductances account for fringing flux which may or may not pass through the reaction plates. Leakage is only weakly dependent on gap, and for the present model, is taken as invariant with gap. Computation of leakage inductance is difficult, but may be measured at larger airgaps. As airgap is increased, total inductance reaches an asymptotic value, i.e., the leakage inductance. A secondary coil may also be wound on each core for sensing the flux density. In that case, Ampere's Law can be used as the basis for finding flux density. Given flux density, Farraday's Law can then be the basis for finding induced voltage. The inductive elements are assumed to have N turns on both the primary and secondary. Increments ΔN and ΔR can be modelled as described below on N and R1, respectively, to permit study of imperfect transducers. Such could be done for leakage inductance as well.

FIG. 3 is a block diagram showing a technique which may be used to process the voltages V1, V2 shown in FIG. 2. The voltages V1 and V2 are subtracted and pass through a synchronous detector. The reference signal for the detector is the source voltage $V_S$ which may be subjected to a phase shift (not shown) prior to being applied to the synchronous detector. Such permits varying the phase for maximum sensitivity. See, e.g., FIG. 1 of U.S. Pat. No. 5,373,123. The synchronous detector may be followed by a low-pass filter (not shown) to reject harmonics of $V_S$.

In view of the foregoing descriptions of FIGS. 2 and 3 and referring back to FIG. 1, it will be understood that the secondary coils of the cores 12, 14 sense signals proportional to the difference between the magnetic flux densities between the cores and the plate 16 or plates 16, 20. Inasmuch as the flux densities are inversely related to the gaps, it is an important teaching of the current invention that a signal indicative of the difference between V1 and V2 is related to the difference between the inverses of the gaps g+x and g−x of FIG. 1 by a very simple relation.

Assuming for simplicity that the coils and cores are identical and positioned symmetrically in the null position, the flux density between the core 12 and the plate 16 may be expressed as $$B_1 = k/(g+x) \quad \text{Eq. (1)}$$

and the flux density between the core 14 and plate 16 may be expressed as $$B_2 = k/(g-x) \quad \text{Eq. (2)},$$

the output is proportional to $B_1-B_2$ and therefore $$V_{OUT} = k\left(\frac{1}{g+x} - \frac{1}{g-x}\right) = \frac{-2kx}{g^2-x^2} . \quad \text{Eq. (3)}$$

This relation is shown in graphical form in various figures below, e.g., FIGS. 8, 11, 14, 19, 20, 21 and 32 for various sensor types and under differing conditions. As will be shown below, the teaching of the current invention as expressed in Equation (3) allows utilization of such a differential sensor over a wide range using a relatively simple signal processing technique (simple divider or, at most, the solution of a quadratic) to determine displacement based on the above relation.

The above equation for Vow applies for the case of the flux sources 12, 14 being permanent magnets as well. In such a case, the magnets may be positioned as shown in FIG. 1 with their north-south poles oriented along the axis 18 and with similar poles facing each other in opposition with respect to the object 16. In that case, the object 16 may be a thin rod supporting a magnetic flux sensor, such as a Hall cell between the two flux sources. The magnets can be mounted within a steel box that is completely closed, except for one side to allow insertion of the Hall cell. Such magnets may be made of samarium cobalt (SmCo). One such position transducer was made using 6×6×6 mm magnet cubes mounted on opposite sides inside such a steel box. In that example, g was equal to 11 mm, the scale factor was 0.5 V/mm, and a working range of ±8 mm was used.

The above-mentioned U.S. Pat. Nos. 5,295,757 and 5,329,077 assigned to Assignee hereof, disclosed an effective, but not very linear, differential position sensing system using Hall sensors. The permanent magnet approach shown below in detail in FIG. 31 differs from that approach in using a much simpler signal processing technique, using one less Hall cell, being mechanically simpler and providing a more linear response. Furthermore, the non-linearity that does exist is mathematically predictable and correctable.

Figure 30:
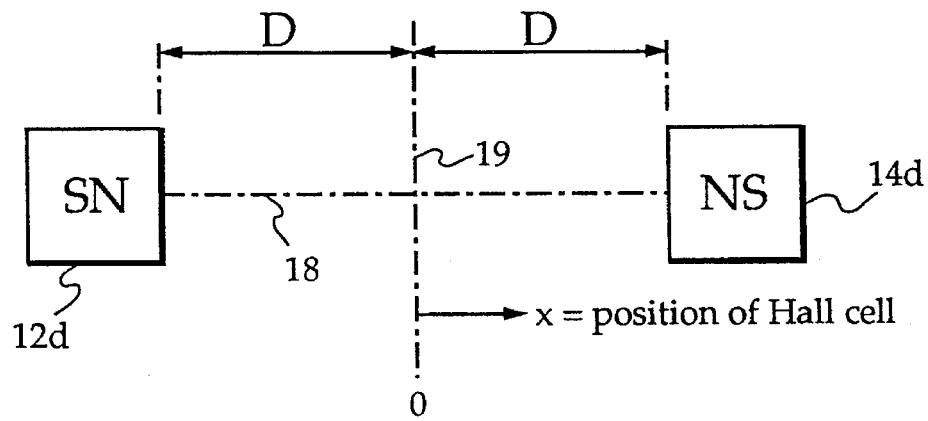
FIG. 30 shows a pair of permanent magnets having similar poles in an opposed axial arrangement, according to the invention.
Figure 31:
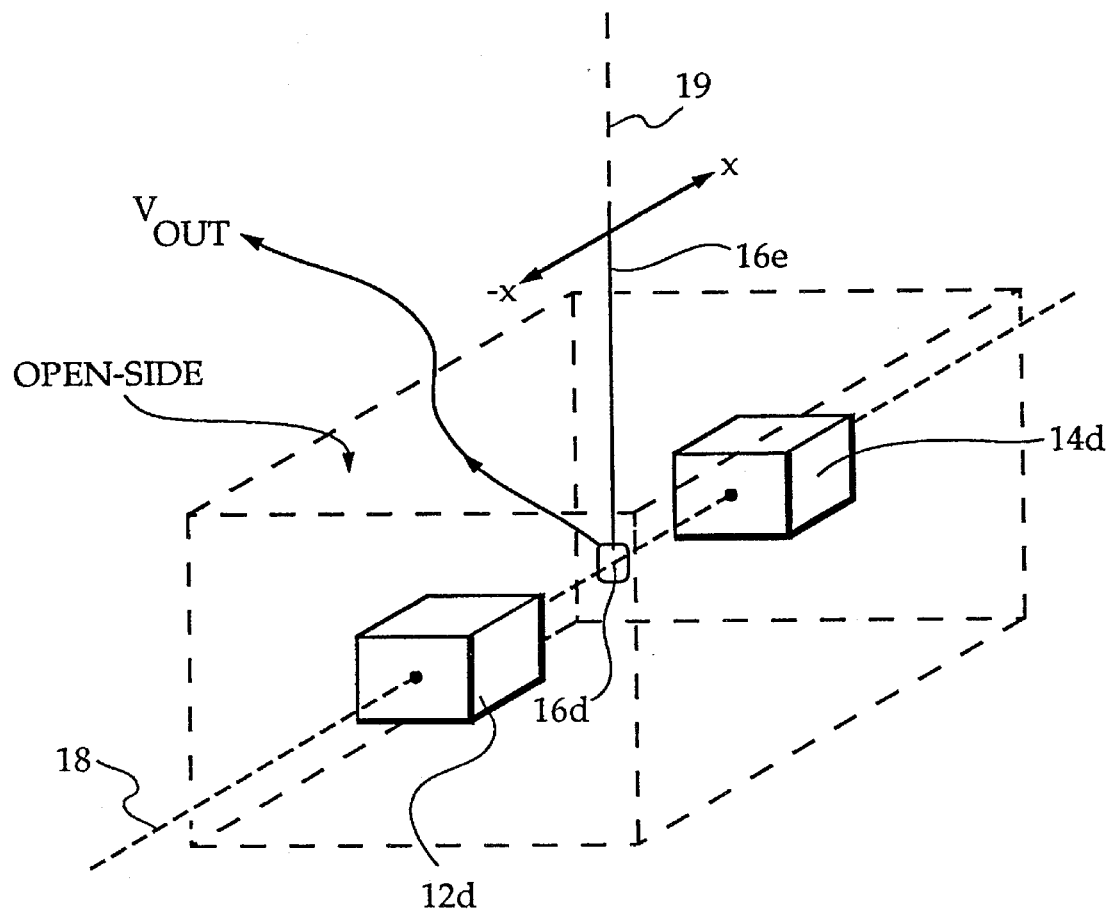
FIG. 31 shows the permanent magnets of FIG. 30 mounted in a steel, five-sided box.

FIGS. 30 and 31 show two small magnets 12c, 14c placed inside a 5-sided, approximately 1.6 mm thick steel box, with one side open. The box provides mechanical support, magnetic shielding and a magnetic flux return path for the magnets. The magnetic flux density colinear with the axis 18 between the magnets is sensed using a Hall cell 16d, as shown in FIG. 31.

The magnets are oriented such that they tend to repel, as shown in FIG. 30. The design shown in FIGS. 30 and 31 is especially simple and has reasonably good linearity. Further, by assuming that the field falls off as the inverse of the distance from the magnet face, it is possible to derive a simple expression for the axial field as a function of displacement from the center position, as follows:

$$\text{Axial field} = \text{constant} * X/(D^2-X^2) \quad \text{Eq. (4)}.$$

This is essentially the same as Equation (3) above. The use of samarium cobalt magnets is desirable, because of the high flux density and good stability with temperature and time. The 6×6×6 mm magnets used cost approximately $1.00 each in large quantities.

The Hall cell may be a Bell GH600. This costs $7.00 each in small quantities. The electronics for the Hall cell can be the same as shown below in connection with FIG. 28, which costs about $35.00.

Figure 32:
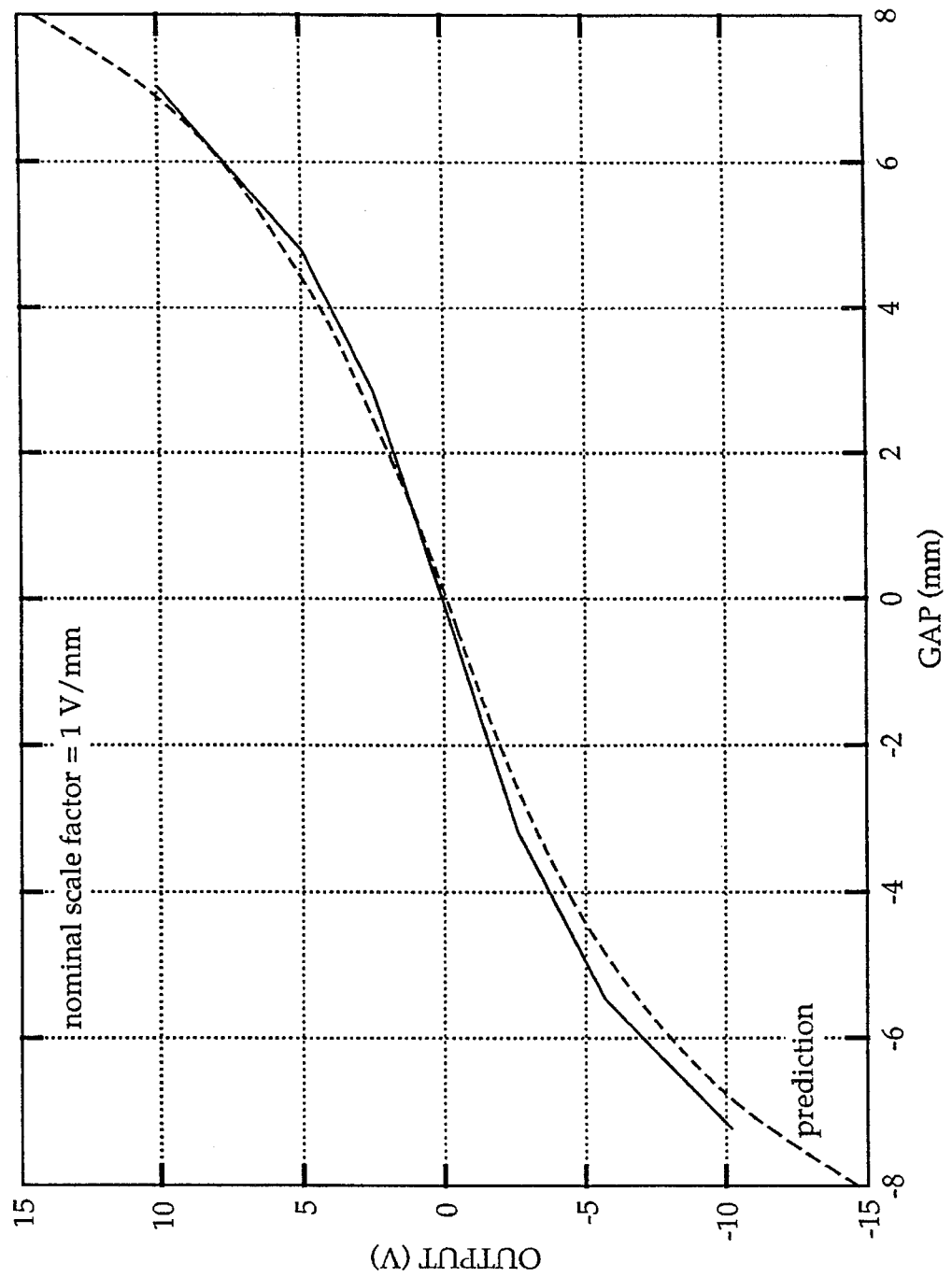
FIG. 32 shows the output of the Hall cell of FIGS. 30 and 31, according to the invention.

The performance of the magnet system of FIGS. 30 and 31 is shown in FIG. 32. For the purposes of active roller guide sensing such as needed in the above-mentioned U.S. Pat. Nos. 5,294,757 and 5,329,077, the indicated non-linearity of FIG. 32 complements well the centering controls thereof. It should be understood, however, that the position sensors shown herein, including the position sensor of FIGS. 30 and 31 may have wide commercial potential outside of elevators and is not limited to that use.

Figure 4:
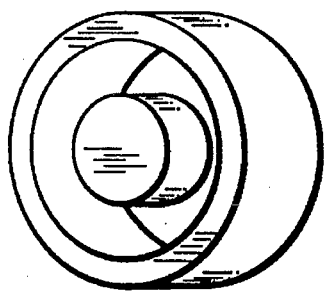
FIG. 4 is a perspective view of a pot core such as may be used with windings to form a flux source, such as shown in FIG. 1, according to the invention.
Figure 5:
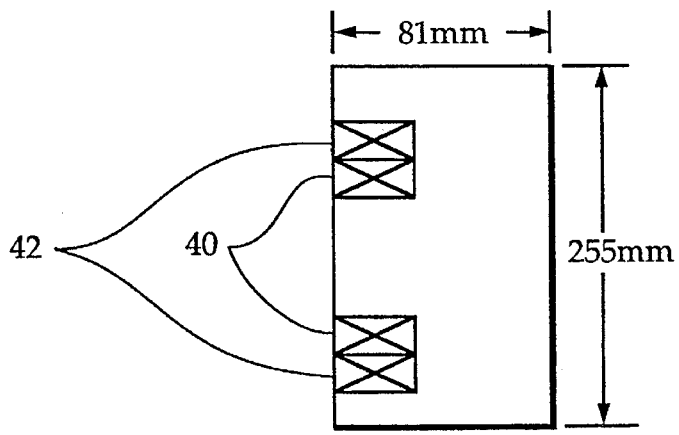
FIGS. 5 and 6 show the pot core of FIG. 4 in section, with different ways of providing primary and secondary windings, according to the invention.
Figure 6:
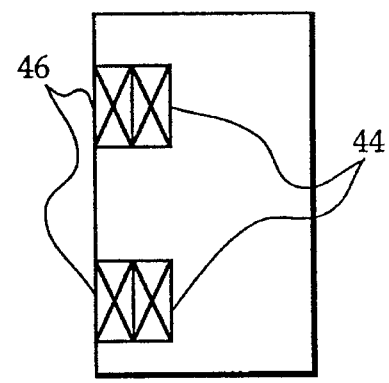

Returning to the example of the sources 12, 14 being coils wound on cores, such can take different forms. For instance, two different and inexpensive types were used in carrying out the present invention and will be described herein without limitation. One was a pot core type based on a Philips Components Series 2616 pot core having mechanical dimensions shown on page 2–24 of the Philips Components Discrete Products Division Catalog, Ferrite Materials and Components, 8th Edition obtained from Philips Components, Materials Group, 5083 Kings Highway, Saugerties N.Y. 12977 (914-246-2811). These pot cores are usually purchased as pairs to be mated after the windings are in place to form a closed construction magnetic device. Electrical data is also shown therein. Such a pot core is about 255 mm in diameter and has a height of about 81 mm, as illustrated in FIG. 4 in perspective. FIG. 5 shows a side sectional view of the pot core of FIG. 4 with a pair of windings 40, 42. The windings are formed on bobbins (not shown) which are then slipped over the center post, as shown. The inner winding 40 may be a driven (primary) winding while the outer winding 42 may be a sense (secondary) coil. FIG. 6 shows another winding technique were a driven coil 44 is on a bobbin (not shown) at the bottom of the well of the pot core while the sense coil 46 is on a bobbin at the top. It should be realized that FIGS. 4–6 are not to scale.

Figure 7:
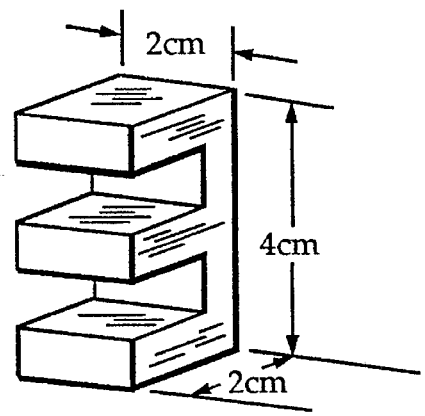
FIG. 7 shows an "E-core" such as may be used along with primary and secondary windings as part of the sensor of FIG. 1, according to the invention.

Another type of core that may be used, according to the invention, is an E-core such as shown in perspective in FIG. 7 (not to scale) and which may also be purchased from Philips Components as E-cores of the Series 783E776 appearing with mechanical and electrical data at page 4–12 of the above mentioned catalog. These are also usually mated in pairs, as shown in the catalog. Such an E-core has a height of about 4 centimeters and a width and depth of about 2 centimeters, as shown. These can have driven and sense coils wound in a manner similar to that shown in FIGS. 5 and 6 for the pot core configuration, i.e., with coils wound as shown in cross-section in FIGS. 5 and 6, except being rectangular.

Figure 8:
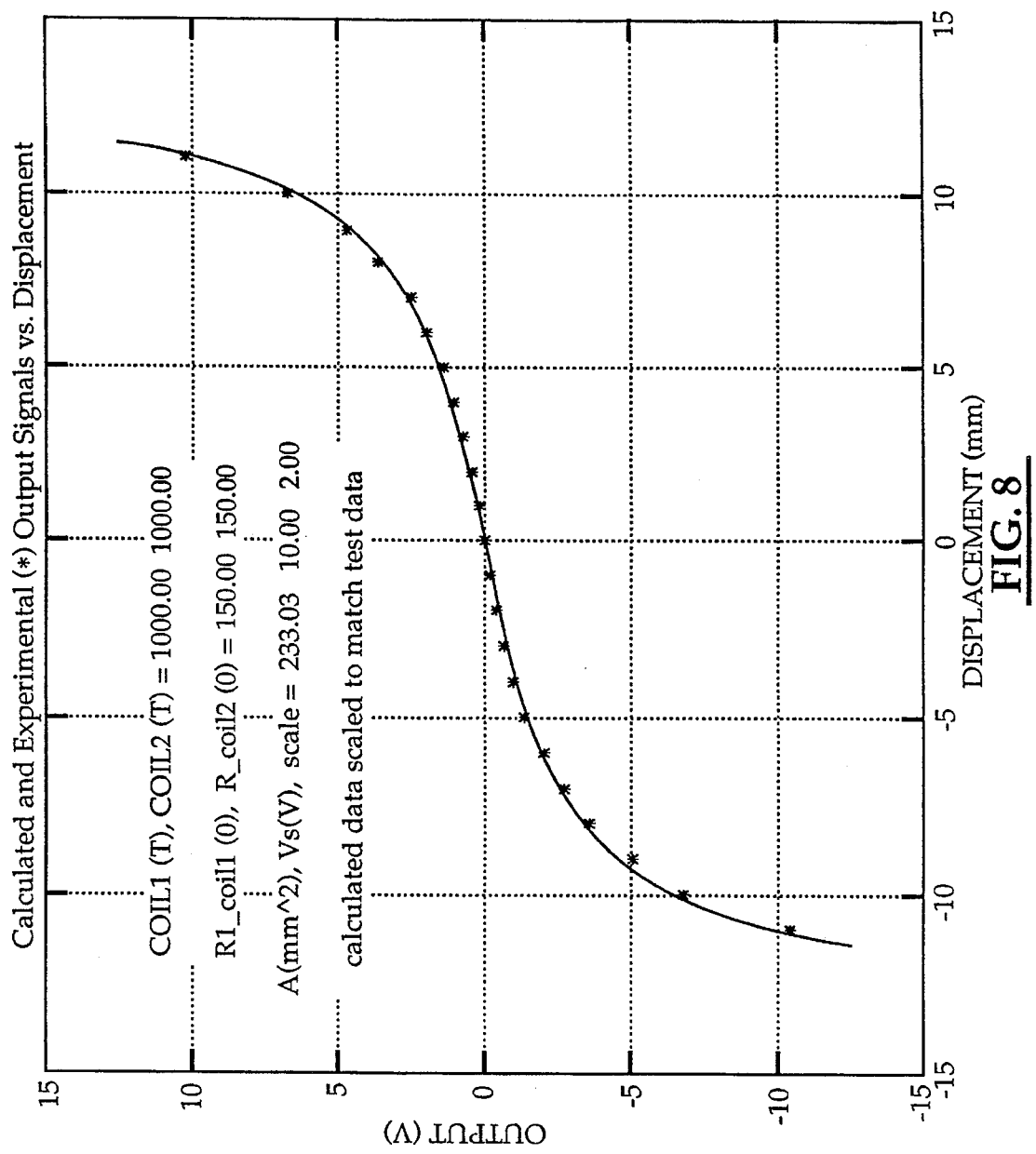
FIG. 8 shows calculated and experimental performance data for an E-core differential transducing system, according to the invention.

FIG. 8 shows calculated (solid curve) and experimental (asterisks) performance data for an E-core (as in FIG. 7) differential transducing system with cores 12, 14 arranged on either side of an object 16, as in FIG. 1. As shown at line 8 of a MATLAB code illustrated in FIG. 9A, it assumes an effective cross-sectional area for the E-core of FIG. 7 of 233 mm$^2$. MATLAB is available from The Math Works, Inc. 24 Prime Park Way, Natick Mass. 01760-1500 (508-653-1415). FIGS. 9A, 9B and 9C together summarize in MATLAB code the constants relied upon and the computations for plotting the displacement versus output voltage curve of FIG. 8 and the displacement versus load impedance (as seen by oscillator) of FIG. 10. The working gap (g) as shown at line 12 of FIG. 9A was 12 mm. The voltage source $V_S$ was 10 volts RMS (as shown at line 9), the frequency of the oscillator 2,500 Hertz (see line 10), and the number of turns was nominally 1,000 (line 14). R1 was 150 ohms (line 18). This gave a nominal inductance ($L_0$) of 12.2 mH per coil at zero displacement according to a well-known formula for the inductance of an ideal toroid with airgap (line 26). The leakage inductance used for the differential system was experimentally determined to be about five times the nominal (line 27).

The computation may be obtained as shown in FIGS. 9A, 9B and 9C assuming a geometry that is well balanced (i.e., ΔN and ΔR1 are zero). However, as mentioned, the code of FIGS. 9A–9C was written in such a way as to permit a study of an unbalanced winding. For instance, lines 15–20 list the capability to change the balance in the number of windings in the coils for the computation. Such a study using the code of FIG. 9 has shown that the design is not very sensitive to ΔN (DELN) and ΔR1 (DELR1) if the DC offset is compensated by an equal but opposite DC signal. However, it is unnecessary to consider these cases here and it should be understood that certain terms appearing in the code of FIGS. 9A–9C may be ignored for an assumed balanced coil condition. For instance, the term –DELR1/2 can be omitted from line 20.

At line 24 of FIG. 9A of the permeability of free space is specified and a constant defined in line 25 to take account that the transducer has two airgaps. Lines 26 and 27 define the nominal and leakage inductances, previously discussed, respectively. Line 28 defines the gap increments (delg) for the computation as every tenth of a millimeter between −0.95 and +0.95 of the nominal gap. As will be understood to one of skill in the art of control systems, the MATLAB system requires a matrix solution and line 29 provides a matrix of "ones" to permit the necessary matrix operation shown subsequently. Line 30 defines the quantity g1 as being the nominal gap times the "ones" matrix plus the ΔG (delg) matrix defined in line 28. The airgap inductance L1 of FIG. 1 is defined in line 31 of FIG. 9A where the "period" after the term "CONST" indicates "term by term".

Line 32 defines the gap (g2) on the other side of the plate 16 of FIG. 1 similar to line 30 except subtracting the Δg (delg). L2 is defined in a manner similar to that of L1 in line 33. The reactive part of the cores 1 and 2 of FIG. 1 are defined in lines 34 and 35 by multiplying the $\omega_0$ of line 11 by the inductances L1 and L2 of lines 31 and 33. Similarly, the impedances Z1, Z2 of lines 36 and 37 are defined with the real and reactive components summed together as will be understood by one of skill in the art.

The driving point impedance is shown in line 38. The current (I) is shown calculated in accordance with Ohm's law in line 39 while the $V_{OUT}$ of line 41, also calculated in accordance with Ohm's law is the same as shown in FIG. 3.

Lines 42–85 simply shows a routine for plotting some actual data measurements taken by experiment in order to compare with a similar plot shown in lines 86–107 of the calculated values calculated according to the previously described lines 1–41. Lines 108–114 carry out the plot of FIG. 10.

Figure 10A:
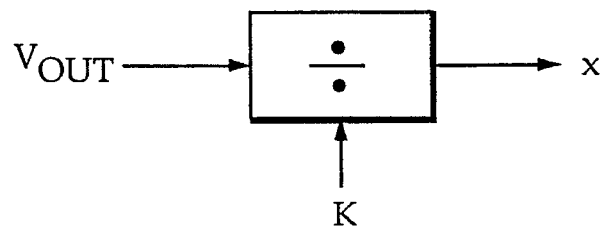
FIG. 10A shows a simple signal processing technique, according to the invention.
Figure 10B:
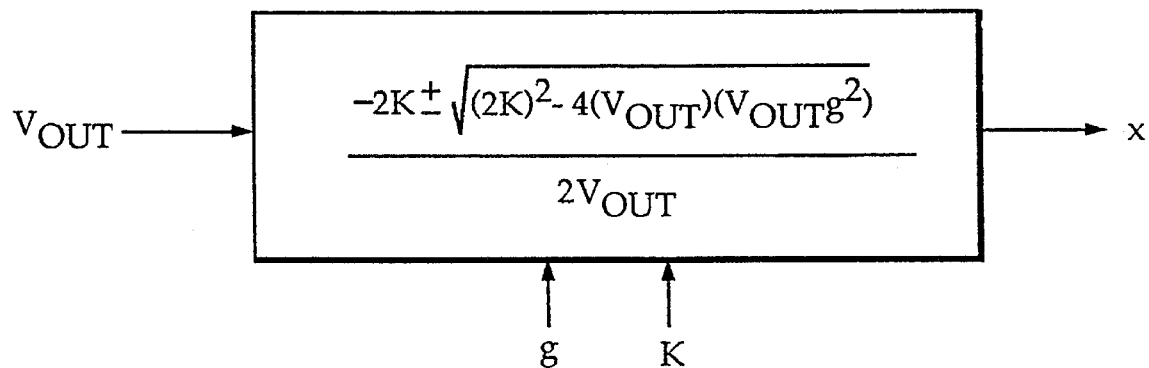
FIG. 10B shows the solution of a quadratic, for certain sensor applications, according to the invention.

The above described differential mode transducer system functions in a very linear manner in the zone between plus or minus 5 millimeters as shown in the plot of FIG. 8. Operating in such a restricted zone of ±5 mm would permit the use of a very simple signal processing technique, such as shown in FIG. 10A using a divider as shown or a simple multiplier. On the other hand, a signal processing technique such as shown in FIG. 10B involving the solution of a quadratic would permit the use of the curve of FIG. 8 over the full range.

Figure 10C:
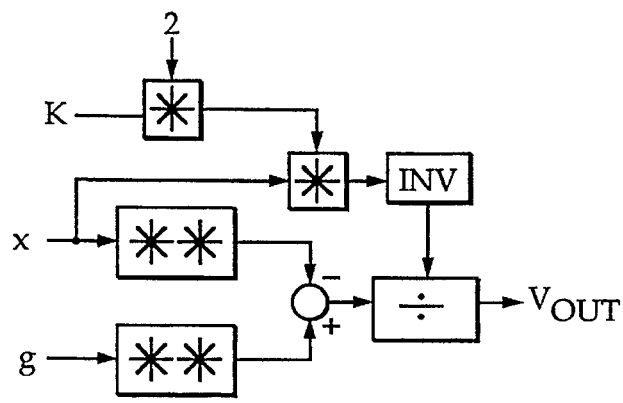
FIG. 10C shows a signal processing technique that could be used if the displacement were known and it were desired to obtain an unknown voltage output, according to the invention.
Figure 14B:
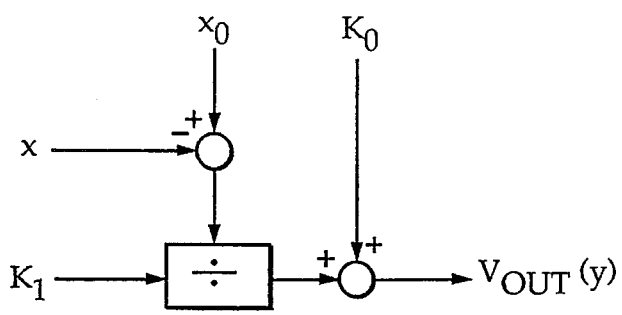
FIG. 14B shows another simple signal processing technique that can be used where Vow is the unknown and displacement is known, according to the invention.
Figure 10:
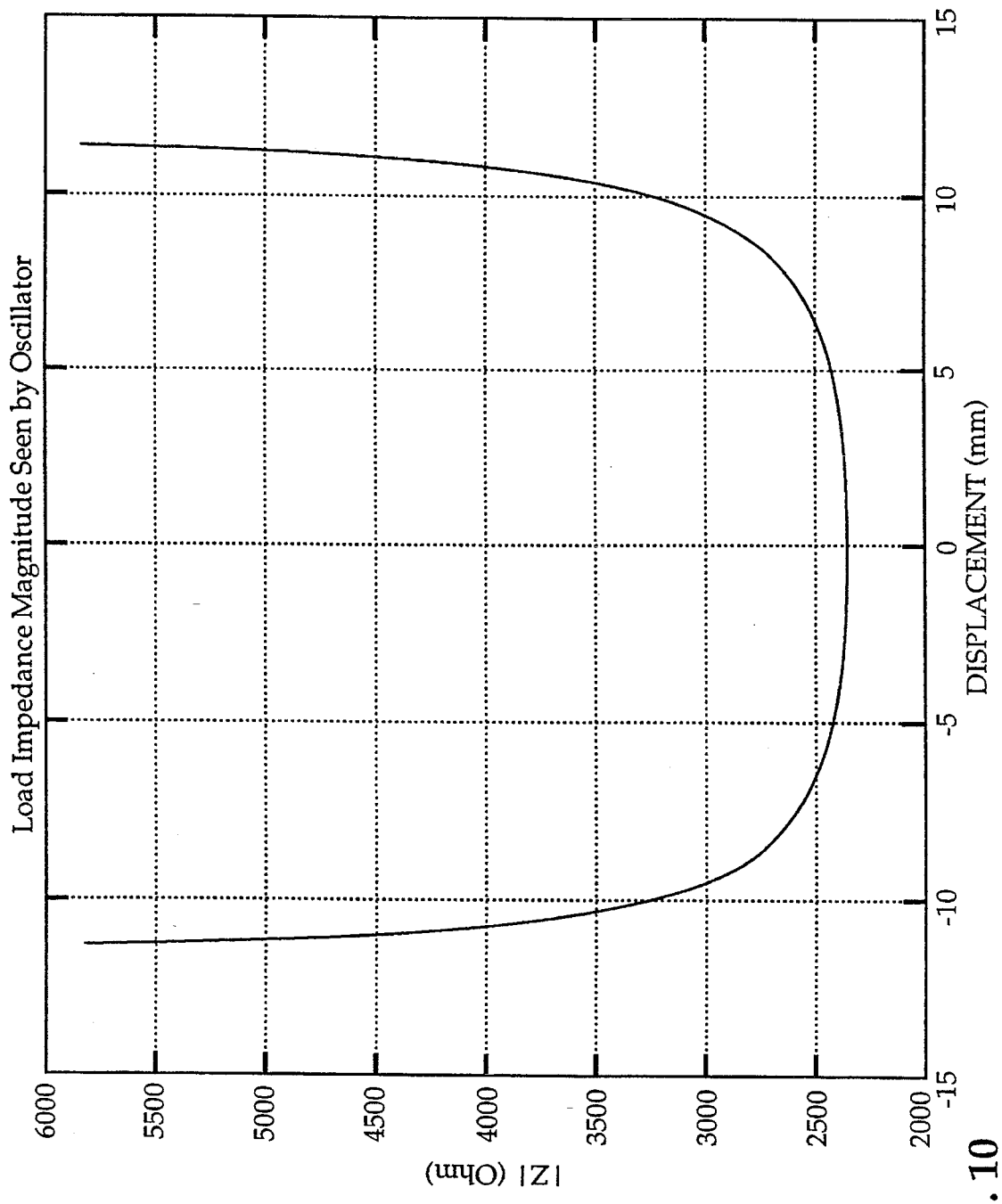
FIG. 10 shows the displacement of FIG. 8 vs. load impedance (as seen by the oscillator of FIG. 2), according to the invention.

The matching of the model of FIG. 1 to the test data shows that eddy-current effects on performance are minimal. The sensor system truly behaves as a low-frequency inductance apparatus. FIG. 10 shows the load impedance seen by the oscillator ($V_s$). Tests done with pot cores described below for an elevator application suggest that the E-core system would also be capable of operating in an eddy-current mode (using a non-magnetic object 16). In the below-described elevator application, both ferromagnetic and aluminum targets were used, and the shape of the response was found to be not much affected by the target material however, with a steel target, the output was three times higher than with aluminum.

Figure 13:
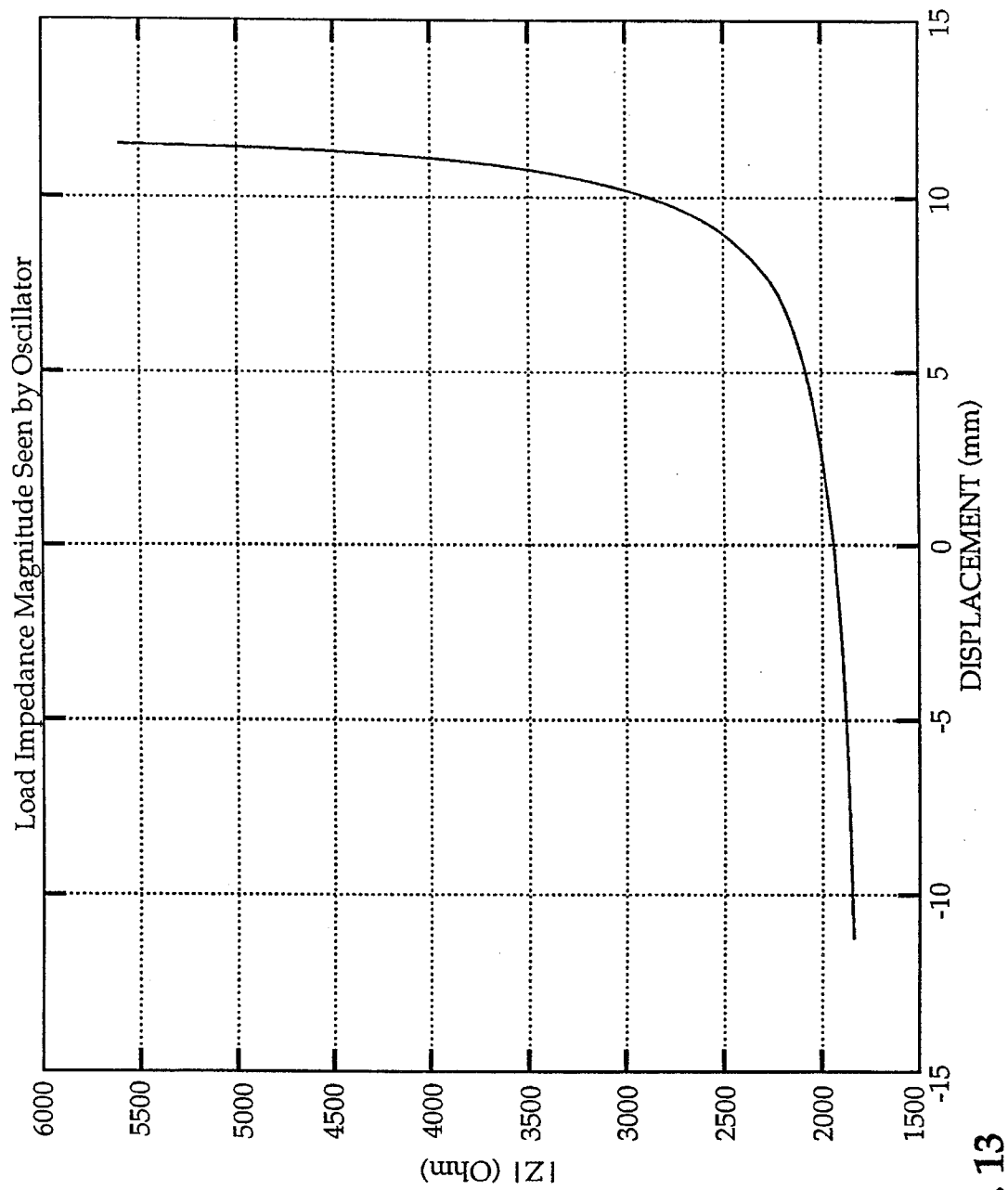
FIG. 13 shows the load impedance for a single-ended approach, according to the invention.

FIGS. 11, 12A, 12B, 12C and 13 relate to a single-ended sensor system and are analogous to FIGS. 8–10 for the differential system. The difference, as explained above for FIG. 1, is that the gap for one core is fixed at the nominal value (g) of, e.g., 12 mm. The other gap is allowed to vary from the nominal. This is a technique that transforms the differential system into a single-ended system. This can be important in different types of systems where a differential system cannot be implemented or is impractical. The comments made above for the MATLAB code of FIGS. 9A–9C for the differential system are generally applicable to the single-ended system and will not be repeated for FIGS. 12A, 12B and 12C. Both systems have a nominal air gap inductance $L_0$ of 12.2 mH per coil, i.e., at zero displacement. The leakage inductance used for the differential system as $5*L_0$ whereas the leakage for the single-ended system was taken to be $4*L_0$. This was determined experimentally. The modeling done here is not very sensitive to $L_{leak}$ because the computed data is scaled to fit the experimental data. The high leakage inductance makes the system perform as if it were powered by a current source rather than a voltage source. The load impedance seen by the oscillator ($V_S$) is shown in FIG. 13.

Figure 11:
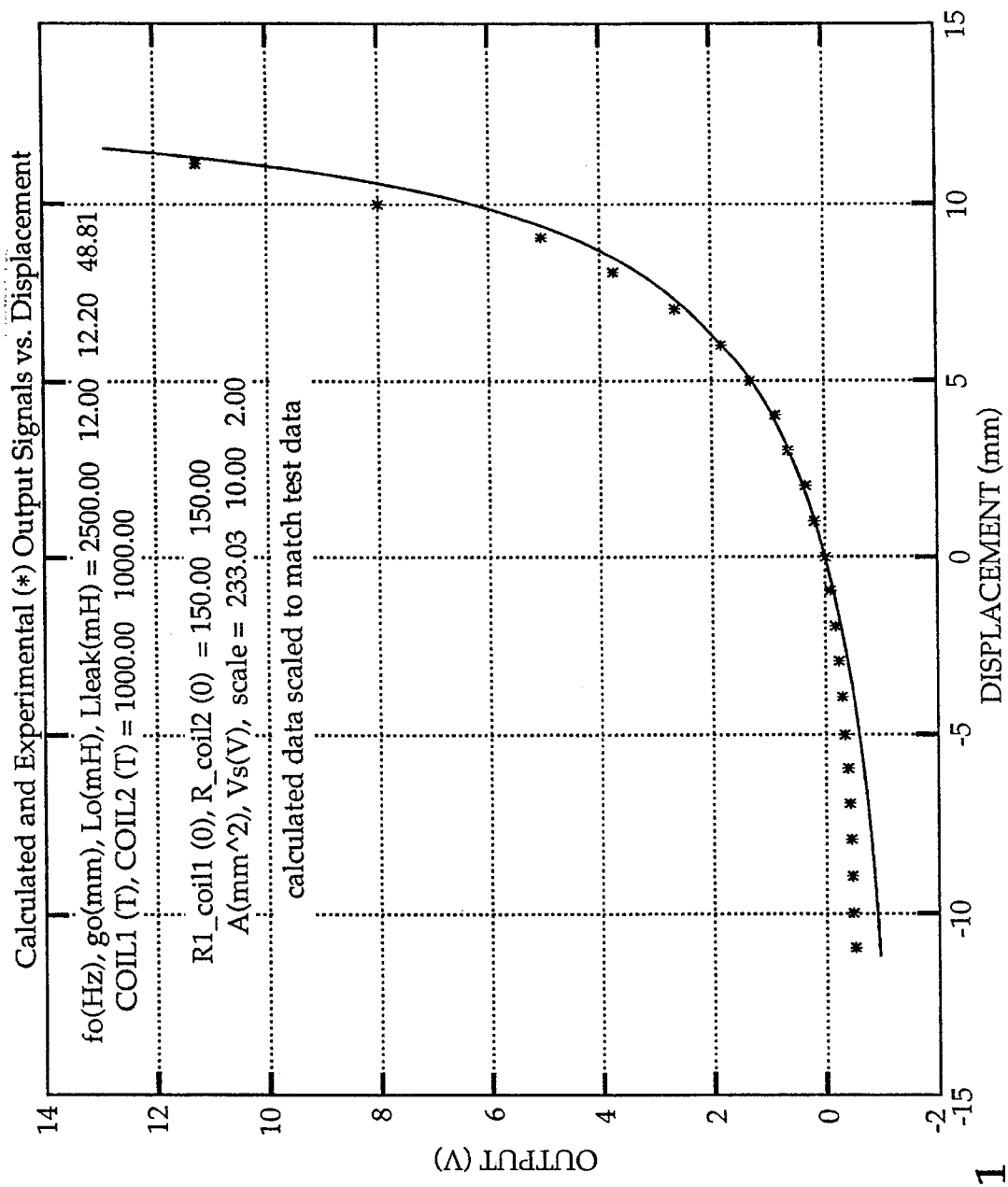
FIG. 11 illustrates the output voltage of FIG. 3 vs. the displacement of FIG. 1 for a single-ended sensor system, according to the invention.

In the single-ended system of FIGS. 11–13, the core with the non-moving gap, as in FIG. 1, is used to provide a bucking signal that causes the transducing system to have zero output at its null (zero displacement) position. The bucking function may be provided in a different manner as well. It could, for example, be provided by injecting a signal equal to $V_2$ (see FIG. 2) into the detection system shown in FIG. 3. $V_2$ for many applications may be taken as a fraction of $V_S$ (no phase shifter required). Another possibility for the single-ended system is to make $V_2=0$ and use a DC offset at the output of the synchronous detector. This technique has a penalty of degraded dynamic range, however.

Figure 14A:
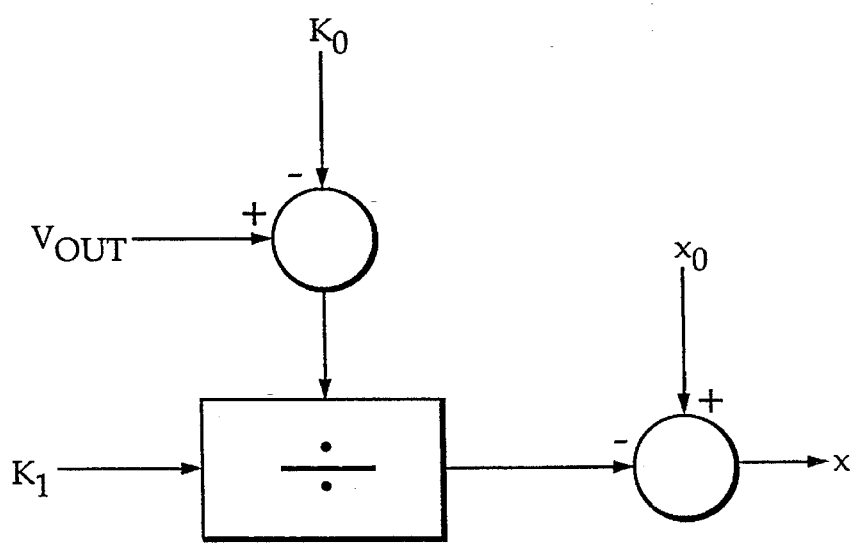
FIG. 14A shows the simple type of signal processing that is exemplary of a single-ended system such as shown in FIG. 14, according to the invention.
Figure 14:
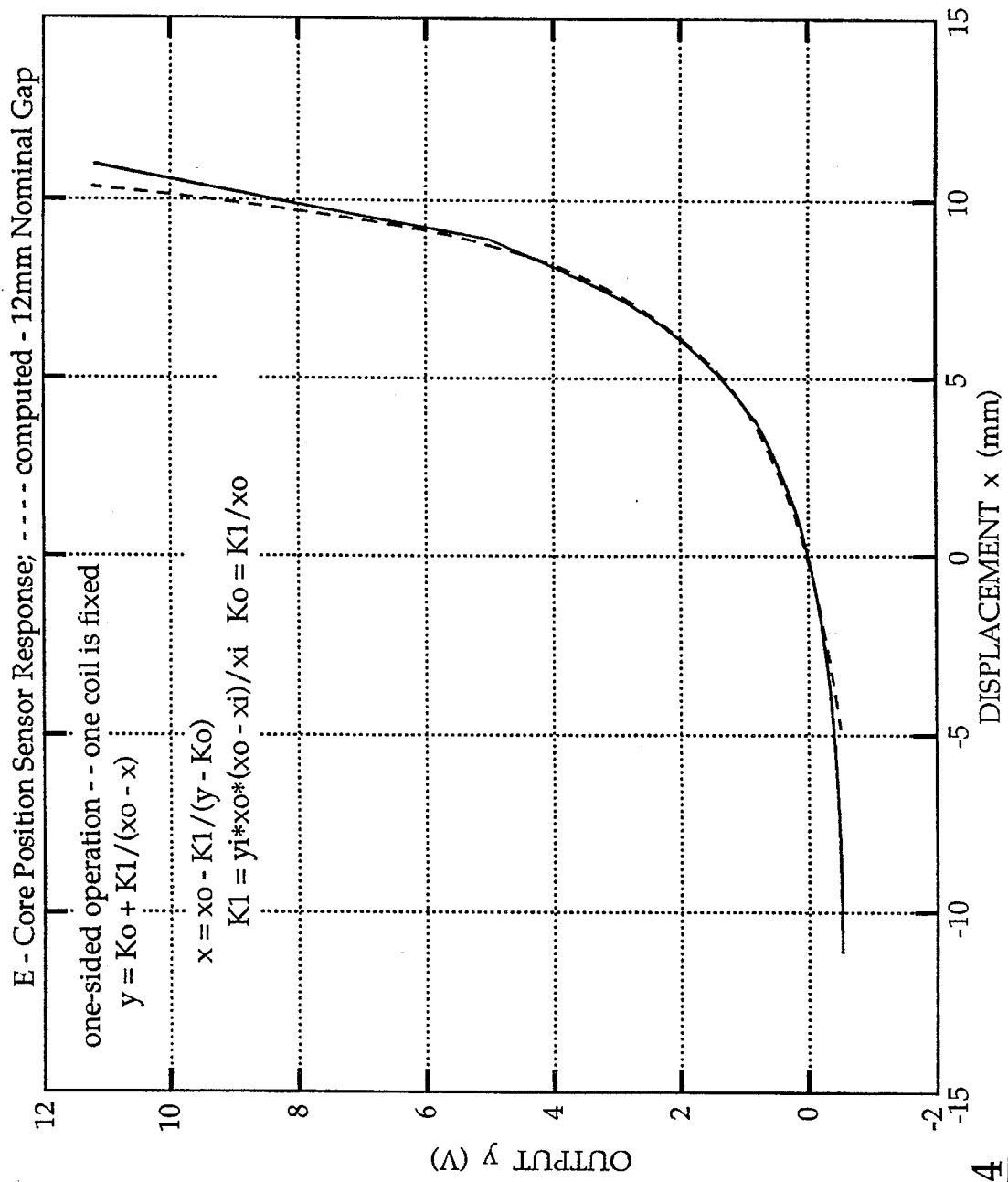
FIG. 14 shows another example of a single-ended system with computed values shown with a dashed curve and actual data show as a solid curve.

An important finding for the single-ended system as shown in FIG. 14 is that a very simple equation may be accurately fitted to the data. This equation is essentially the same as Equation (3), except that one of the division terms becomes a constant, as follows:

$$V_{OUT} = y = K_0 + \frac{K_1}{(x_0 - x)} \quad \text{Eq. (5)}$$

Eq. (5) is easily solved for x. This gives gap (x) when the output voltage y is known, i.e., $$x = x_0 - K_1/(y - K_0) \quad \text{Eq. (6)}.$$

As will be appreciated, this equation lends itself to an extremely simple implementation for linearization of the transducer characteristic using digital computations or analog circuitry using a divider, as shown generally in FIG. 10A and in more detail in FIG. 14A.

It will be recalled that for a differential system, using Eq. (3) above, if displacement is the independent variable and output ($V_{OUT}$) is the dependent variable, as suggested in Eq. (3), the relation is easy to solve in the signal processing art. Such a solution is shown in FIG. 10C, for example. The inverse relationship, however, is complex, requiring the solution of a quadratic equation, as previously shown in FIG. 10B. It is the inverse relationship that is needed in practice. In accordance with the teachings hereinabove, the single-ended system, on the other hand, has an extremely simple relationship between displacement and output, irrespective of which variable is independent, as illustrated in FIGS. 14A corresponding to Eq. (6) and 14B corresponding to Eq. (5).

For the practical case of $V_{OUT}$ being the independent variable, a comparison of the signal processing requirements of a differential system such as shown in FIG. 10B with those of a single-ended system such as shown in FIG. 14A reveals the simplicity of those requirements for the single-ended system FIG. 14 shows the above relation (dashed line) with experimental data (solid line) for the single-ended transducer system. The functional relationships between output $V_{OUT}(Y)$ and displacement x are shown, together with the equations that define the constants $K_1$ and $K_0$:

$$K_1 = Y_i * x_0 * (x_0 - x_i)/x_i \quad \text{Eq. (7)}.$$

$$K_0 = -K_1/x_0 \quad \text{Eq. (8)}.$$

The equations are fitted by specifying the nominal gap $x_0$ and one coordinate $(x_i, Y_i)$ of the measured data. As can be seen in FIG. 14, the accuracy of the fit is remarkable and an indication that the physical laws previously discussed indeed govern the sensor's operation. The ability to fit an equation as shown has great practical significance, as illustrated by the very simple signal processing of FIG. 14A. This is particularly so when it is considered that the pot cores and E cores shown previously in connection with FIGS. 4 and 7 are extremely inexpensive, and the further consideration that the signal processing hardware to carry out the sensing function is similarly inexpensive and simple. The sort of sensor described can be built with signal processing hardware for on the order of $25.00. This would include a synchronous detector, summers, dividers, phase shifters, oscillators, cores, windings, bobbins, etc. It is also considered highly advantageous to be able to provide such a sensor at such a small size and with such tremendous accuracy capabilities, as described and shown herein. FIGS. 15A and 15B together show a MATLAB code used to generate FIG. 14 using assumptions similar to those used in FIGS. 9A–C and 12A–C and already explained previously.

Elevator Embodiments

Low-cost contactless position sensing is required for active magnetic guidance of elevators. A working range of up to ±10 mm is needed. Currently, a developmental project of Assignee hereof uses position transducers similar to or identical to that shown in U.S. Pat. No. 3,336,525, discussed above. An extensive search showed that particular type of sensor to be the best available for the elevator application under development. However, these sensors are costly (more than $1,000 in small quantities) and do not perform as desired for the elevator application. They have a strong response to rail joints as the car moves vertically in the hoistway. Also, the shape and hockey puck size of the sensors is not well suited for side-to-side measurements made against the nose of elevator guide rails.

The above-described sensor concept, however, can be easily applied to the active magnetic guidance for elevator applications in an inexpensive and easy way.

Figure 16:
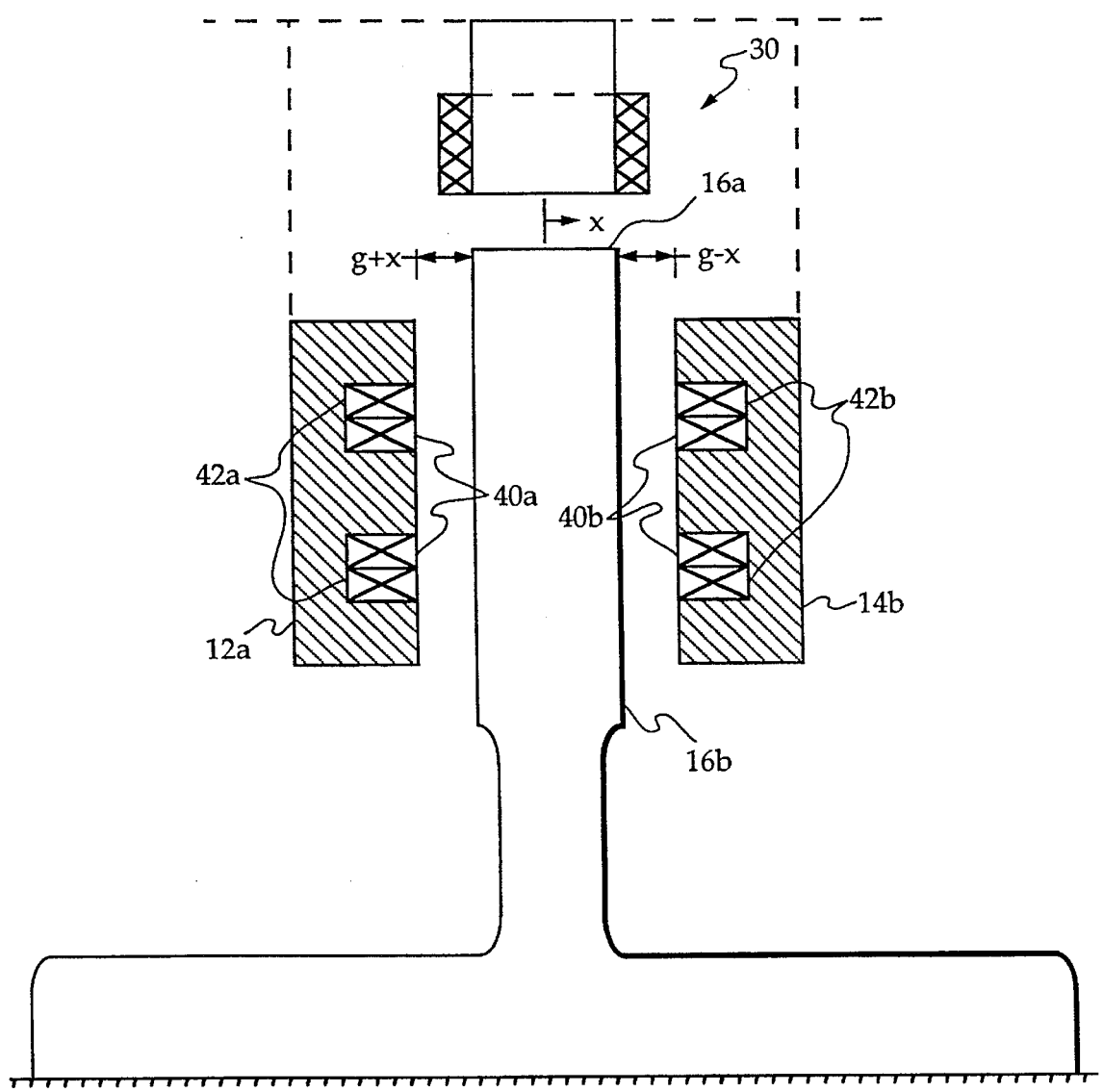
FIG. 16 shows both single-ended and differential sensors such as described generally in FIG. 1 used for an elevator application, according to the invention.

FIG. 16 shows an elevator application with pot core transducers 12a, 14b on either side of a hoistway rail blade 16b. The pot cores 12a, 14b are of the type shown in FIG. 4 and are shown using only one of the alternative winding methods illustrated in FIGS. 5 and 6. Of course, in practice, one or the other alternative winding methods would be used for both pot cores 12a, 14b to keep the flux provided symmetrical. It will be observed that the orientation of the cores 12a, 14b with respect to the blade 16b is similar to that shown for the sources 12, 14 of FIG. 1, and the above-described sensor 10 of FIG. 1 is applicable to FIG. 16 in every respect as well.

A sensor 30 of FIG. 16 is of the type shown in FIG. 7, i.e., an E-core with windings as shown in FIGS. 5 or 6, or any equivalent thereof. The E-core configuration of FIG. 7 is particularly useful for sensing the narrow tip of the blade 16b at a distal end 16a thereof and can be used in the single-ended mode or the differential mode (with another core on the other side of the car). As mentioned previously, an inexpensive E-core can be purchased off the shelf with a width of 2 cm, i.e., with the 4 cm dimension shown in FIG. 7 oriented vertically in the hoistway with the prongs of the "E" facing the narrow tip of the blade.

The E-core sensor 30 may be for measuring side-to-side horizontal motions of the elevator. Front-to-back horizontal motions may be measured using the ferrite pot cores 12a, 14*b*, such as manufactured by Philips. Each core contains two windings, as described above: a primary and a secondary. These windings, of course, may be placed within the cores in a variety of ways, such as, but not limited to, those described previously in connection with FIGS. 5 and 6. Generally, the winding closest to the target may be used as the secondary. The diameter of the pot cores 12*a*, 14*b* should be in the range of 24–50 mm. The width of the E-core should be on the order of 19 mm, e.g., approximately 2 cm. A range requirement for an elevator application may be ±5 mm for front/back sensing and ±10 mm in the side-to-side direction. In view of the examples given above, it will be appreciated from FIG. 8 that a ±5 mm range permits a simple divider as the signal processing technique for front-to-back differential sensing. Similarly, a single-ended approach for side-to-side sensing permits one to avoid the quadratic solution and keep the simple divider and still get the desired range of ±10 mm.

Figure 17:
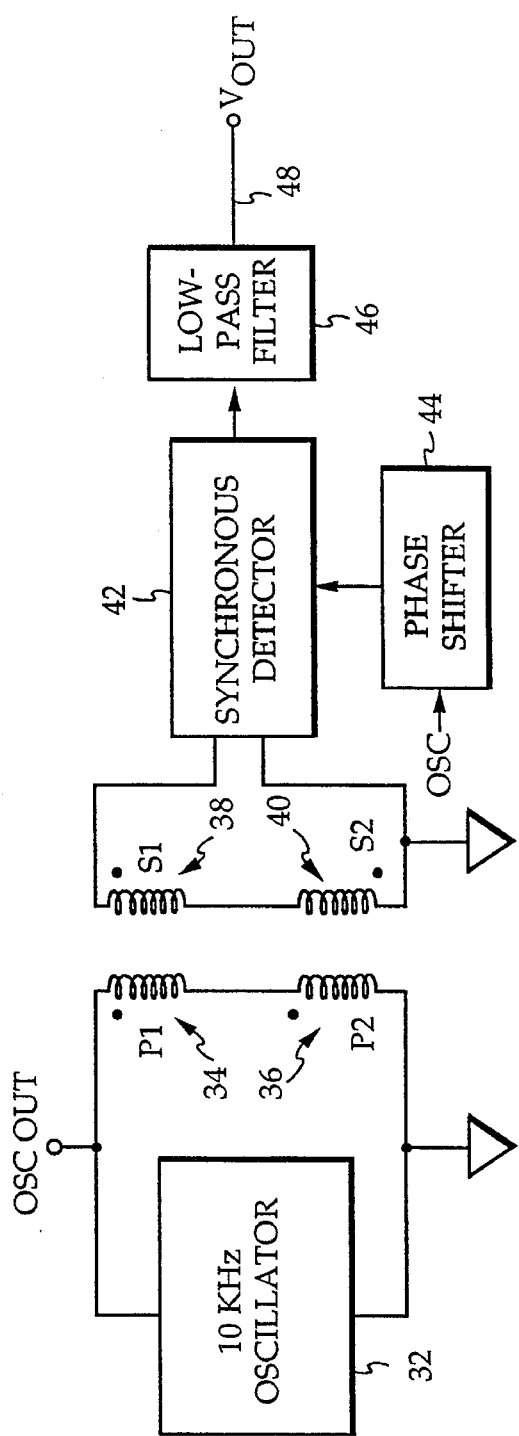
FIG. 17 shows a signal processing technique that can be used for a differential sensor, according to the invention.

A signal processing technique for obtaining $V_{OUT}$ is shown in FIG. 17. An oscillator 32 is used to excite primaries 34, 36 connected in series, having corresponding bucking secondaries 38, 40. A 10 kHz oscillator is shown, although 2.5 kHz is currently used. If each core sees an identical target with identical gaps, then the output of the two secondaries is zero. An unbalance in gaps will cause the voltage in one secondary to rise and the voltage in the other to fall. This results in a net output voltage provided to a synchronous detector to reject spurious signals. A phase shifter 44 is responsive to the oscillator output signal and may be used to adjust the sensitivity of the sensor.

The synchronous detector 42 is available as Schaevitz Model ATA-101 for operation, e.g., at 2.5 and 10 kHz. These can be obtained from Lucas Control Systems Products, 1000 Lucas Way, Hamden Va. 23666 (1-800-7458008). Alternatively, an Analog Devices AD 630 Modulator/Demodulator can be used to provide high-quality synchronous detection, as shown in more detail below. Such can be obtained form Analog Devices, One Technology Way, PO Box 9106, Norwood Mass. 02062-9106 (617-329-4700).

A lowpass filter 46 can be used to filter the output of the synchronous detector to provide an output signal on a line 48, which may be a voltage output indicative of the horizontal position of the car with respect to the rail.

Figure 18C:
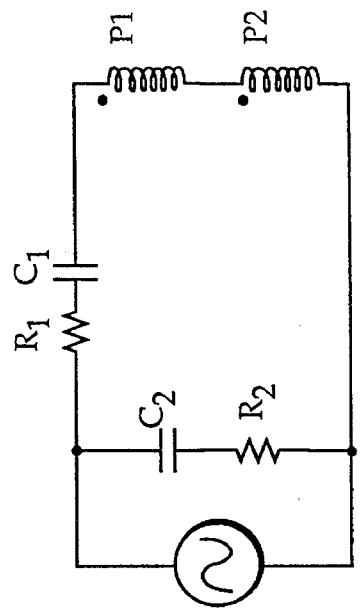
FIGS. 18A–18C show different ways to drive the primaries of FIG. 17, according to the invention.
Figure 18B:
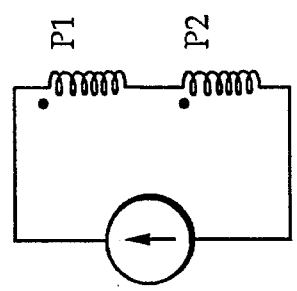
Figure 18A:
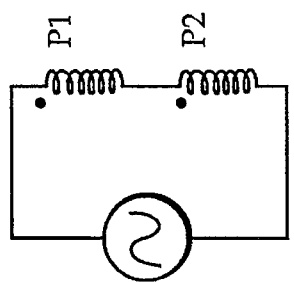

Various methods of driving the primaries are shown in FIGS. 18(*a*), 18(*b*) and 18(*c*). The technique shown in FIG. 18(*a*) uses a "stiff" voltage drive and is usually best for this application. In the absence of leakage inductance and coil resistance, and using a ferromagnetic target, a perfectly linear output vs. displacement is possible. The data presented below was obtained using a voltage drive. An alternative driving technique is the use of a current generator, as shown in FIG. 18(*b*). Shaping of the response and attainment of maximum signal levels is possible using the scheme of FIG. 18(*c*). Adjustment of capacitor C1 permits series resonance or operation close to such a resonance. The use of capacitor C2 to compensate for inductive reactance is useful for minimizing load on the signal source.

The apparatus can be used with a ferromagnetic target. At lower excitation frequencies, operation is in a standard "transformer" mode. At higher frequencies, operation is strongly affected by eddy currents in the target material. The target material can also be non-magnetic. In that case, the primary effect is the result of eddy currents in the target material.

Figure 29:
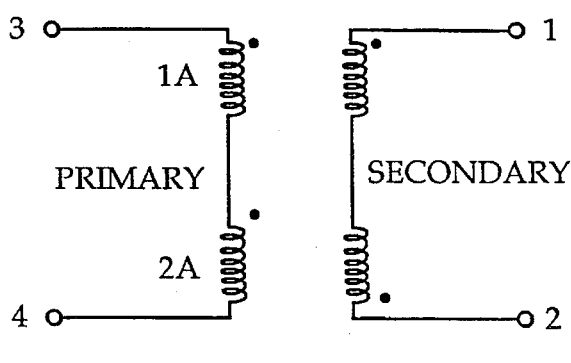
FIG. 29 shows the primary and secondary of a sensor such as may be used in FIG. 28, according to the invention.
Figure 28:
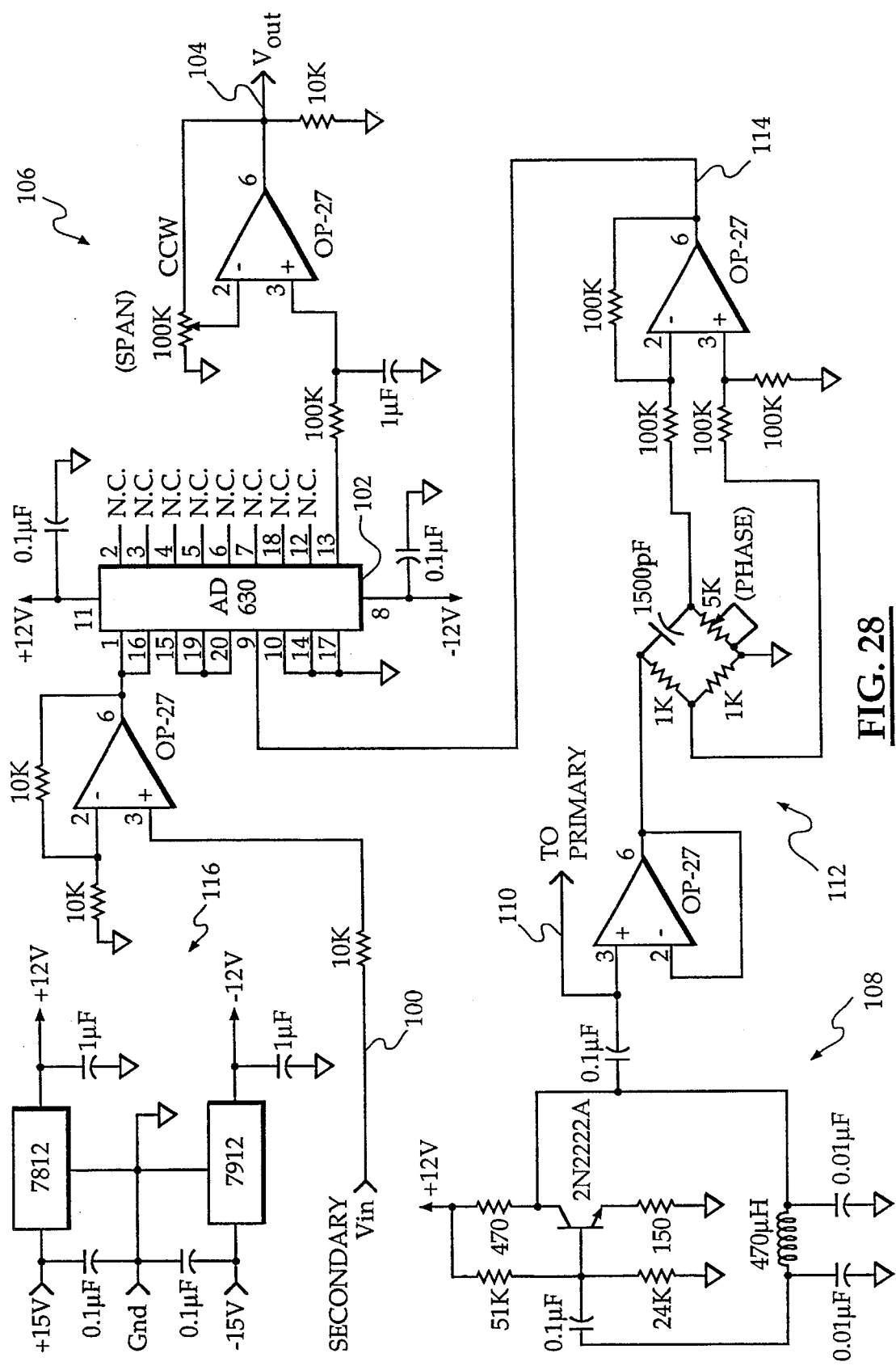
FIG. 28 shows an electronic circuit responsive to a sensed secondary voltage for providing an output voltage, according to the invention.

FIG. 28 shows an Analog Devices AD630 Modulator/Demodulator hooked up as shown to provide high-quality synchronous detection of the output of secondaries hooked up as shown in FIG. 29 in opposition to provide a difference signal on a line 100 in FIG. 28. The modulator/demodulator 102 is responsive thereto for providing a $V_{OUT}$ signal on a line 104. A span circuit 106 is shown and is provided for adjusting span. An oscillator 108 provides a 2.5 kHz signal on a line 110 to the primary of FIG. 29. A phase shifter 112 is provided having an output on a line 114 provided to the modulator/demodulator 102, as shown. A power supply circuit 116 is also illustrated.

A typical system response for the front-to-back sensors 12*a*, 14*b* of FIG. 16 is similar to that described in connection with FIG. 8 and is shown for the above-described elevator application in FIG. 19, using pot cores and both 2.5 and 10 kHz excitation with a 300-turn coil and a nominal gap of 8.65 mm. The output with 2.5 kHz excitation is shown with a solid line, and that with a 10 kHz oscillator in dashed line.

Figure 19:
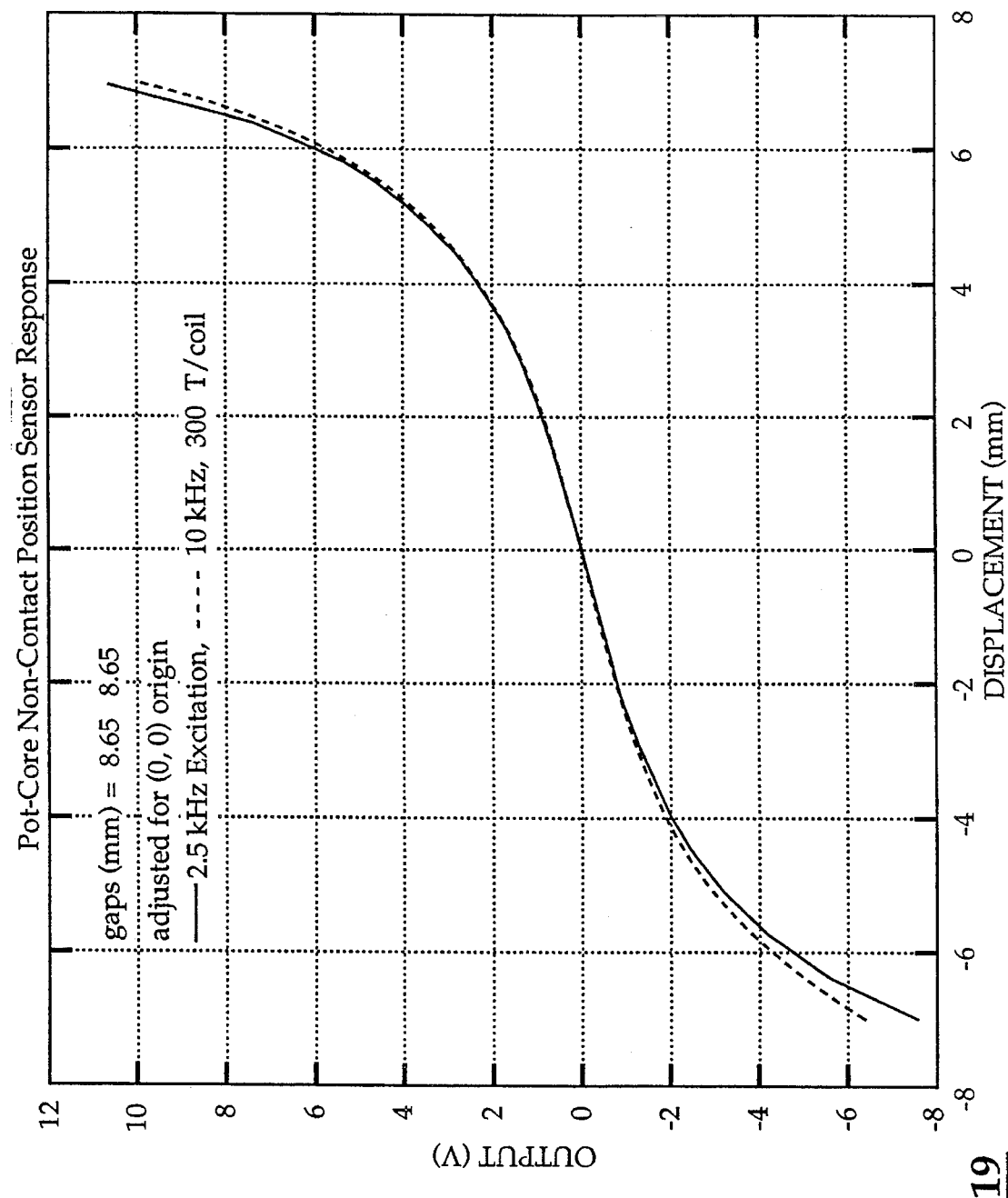
FIG. 19 shows the difference between the pot-core excited with 2.5 kHz (solid line) vs. 10 kHz (dashed line), according to the invention.

The data obtained as shown in FIG. 19 was using the circuit illustrated in FIG. 7 using a Schaevitz ATA-101 demodulator and an pair of 25 mm diameter pot cores. As shown, results are not affected much by a switch from 2.5 to 10 kHz. The coils used for the test were fairly crudely constructed and the number of turns per coil not uniform, yet the final result is exceptionally good. Each core contained a primary next to the center post and secondary coils were would over the primaries, in both cases as shown for the pot cores of FIG. 16. The curves have a shape well suited to centering controls for active magnetic guidance and for active roller guides as well.

Figure 20:
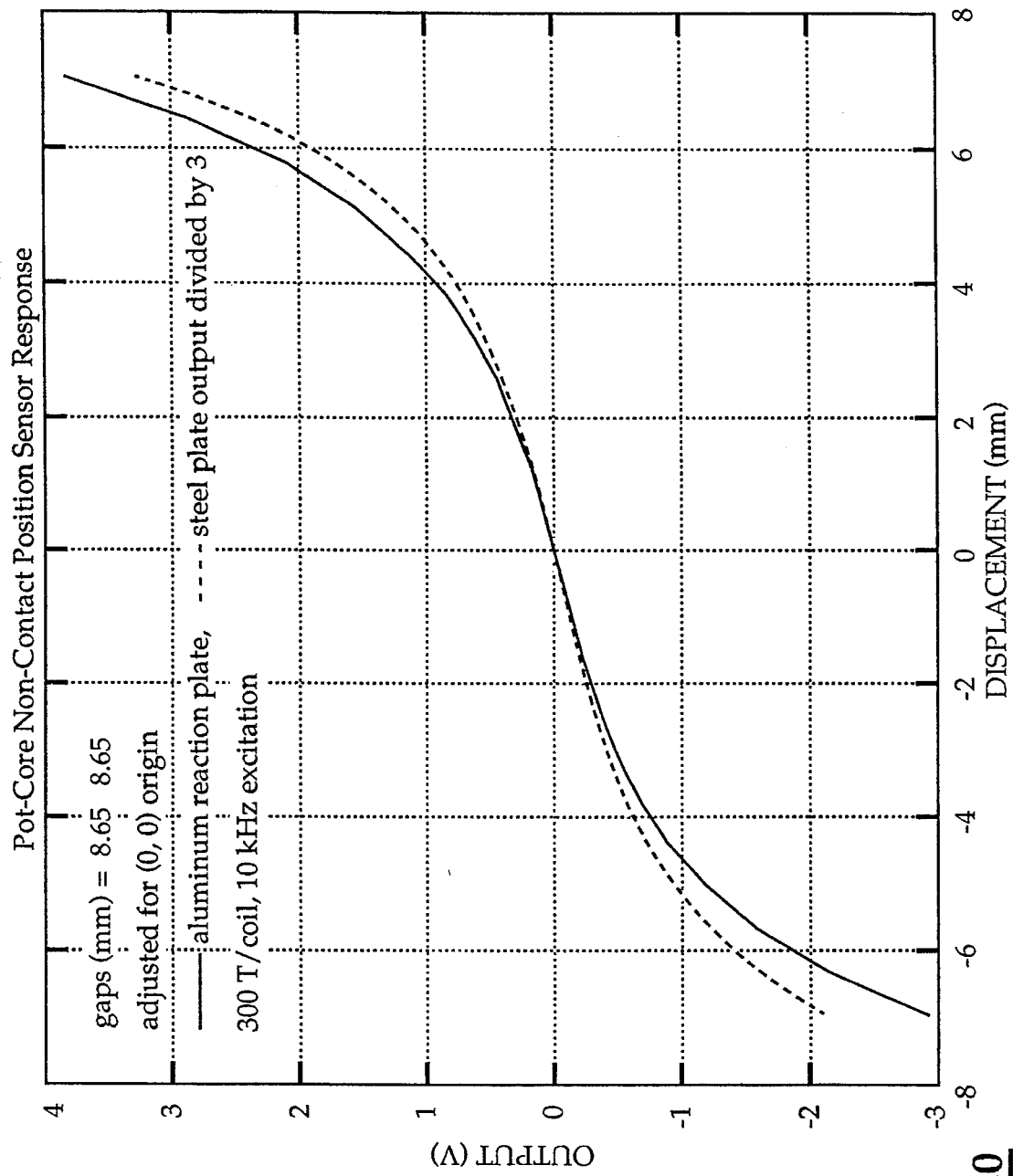
FIG. 20 shows the same setup as used for FIG. 19, except using a non-ferromagnetic target, according to the invention.

FIG. 20 shows the same setup as used for FIG. 19, except using an aluminum target. The shape of the response is not much affected by the target material. However, with a steel rail target, the output is three times higher, so the steel plate output curve has been scaled by three in FIG. 20 for purposes of comparison.

Figure 21:
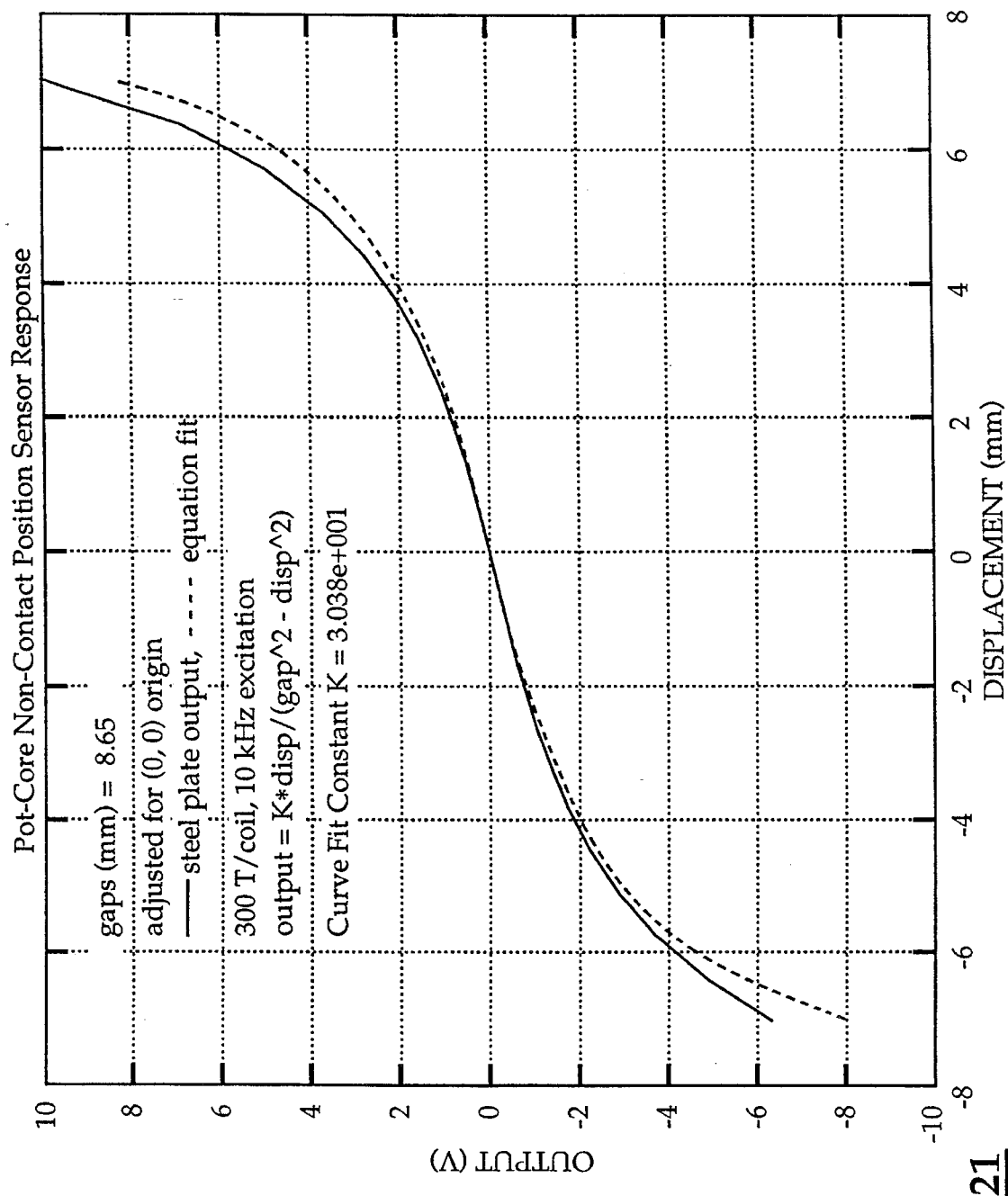
FIG. 21 shows a solid line representing actual measurements using a pot core and a steel plate vs a dashed line showing an equation fitted to the actual measurements for a steel plate, according to the invention.

FIG. 21 shows a solid line which represents actual measurements using a pot core and a steel plate. A simple equation was fitted to the measured response in order to permit linearization of overall response. A single point match at the displacement that is equal to 2 mm was used to find the constant K shown in the figure. The match appears to be satisfactory between the predicted curve and the actual data for an elevator magnetic guidance application. Active roller guide applications should not require any linearization, permitting the use of analog centering controls.

As for the E-coil sensor at the tip of the blade, a non-differential sensor setup may be used, i.e., a single-ended approach, as shown in FIG. 16, using the E-core 30 and using a single core driving a synchronous detector. If it is desired to avoid the use of a second core, the unwanted response from the use of a single core only may in part be eliminated using a cancellation signal from the oscillator (proper amplitude and phase required). AC cancellation is needed to prevent saturation of the synchronous detector. Some offset may be taken out using a DC bias at the output of the synchronous detector.

Having described contactless position sensors using flux sources having coils wound on a core, used in both differential and single-ended mode for industrial purposes, including elevators, a further discussion on how to apply these different types, particularly directed to the elevator problem described previously, follows.

Figure 22:
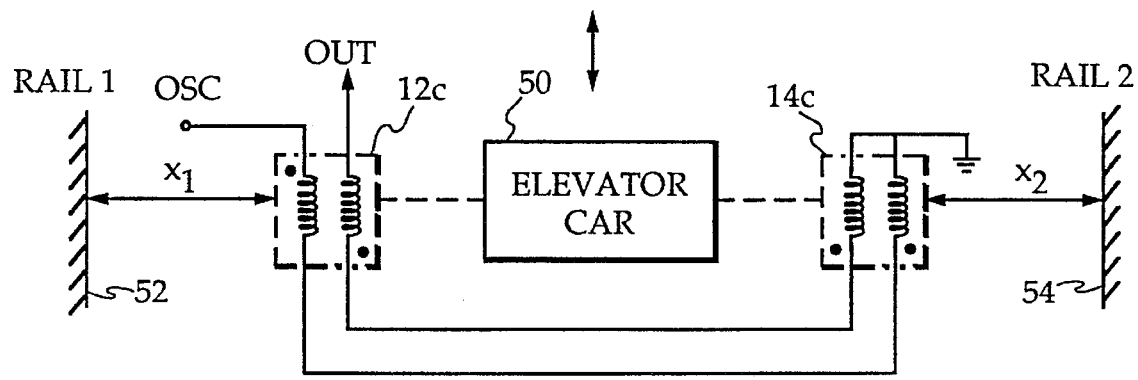
FIG. 22 shows a pair of flux sources mounted on opposite sides of an elevator car and connected for use in a differential transducer, according to the invention.
Figure 23:
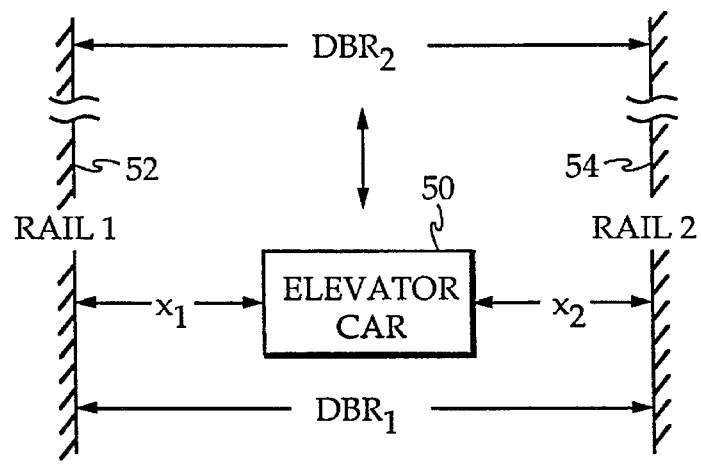
FIG. 23 is similar to FIG. 22, except illustrating the concept of the variation in distance between rails as the elevator travels vertically in the hoistway, according to the invention.
Figure 24:
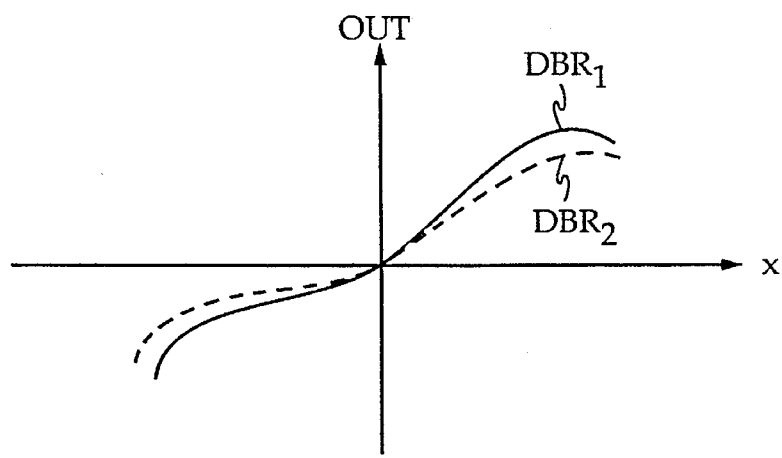
FIG. 24 illustrates how the scale factor of the output vs. displacement curve can change according to variations in the distance between rails, according to the invention.

Differential transducers are preferred for front-to-back measurements for the reasons given above. In other words, the coils 12*a*, 14*b* of FIG. 16 would be hooked up in a differential manner, such as shown in FIG. 17. The coil 30 of FIG. 16, on the other hand, for side-to-side measurements is preferably used in a single-ended configuration for the reasons given above. This can imply added expense if two coils are used on each side, and particularly where two separate sets of electronics are used. A differential configuration would be better, because one coil could be used on one side of the car for interfacing with one rail, and another coil could be used for sensing the other rail on the other side of the car, as shown in FIG. 22, for example. There, an elevator car 50 travels vertically in a hoistway, guided by rails 52, 54 on opposite sides of the car 50. A pair of cores 12c, 14c are rigidly attached to the elevator car 50 on opposite sides thereof, for sensing rails 52, 54, respectively. However, as shown in FIG. 23, the distance between rails (DBR) changes as the elevator car progresses up and down the hoistway. This is manifested as shown in FIG. 24 by a scale factor change in the output vs. displacement characteristic of the transducer.

According to the teachings of the invention, a method may be used for desensitizing the differential sensor from nominal gap variations, such as a changing DBR in an elevator application.

Instead of simply taking the output signal as shown in FIG. 22, for instance, as a differential output signal between secondaries wound in opposition, the difference signal is divided by a sum signal indicative of the sum of the voltages of the two secondary windings. This may be obtained from the primaries or the voltage source. By using such a ratiometric technique, any DBR changes between rails appear in both the numerator and denominator and affect each equally, thereby being obviated.

Figure 27:
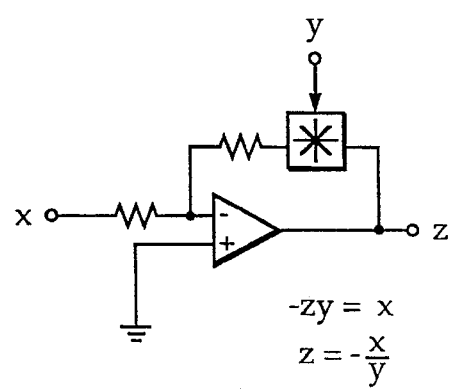
FIG. 27 shows a simple divider circuit for use, according to the invention.
Figure 25:
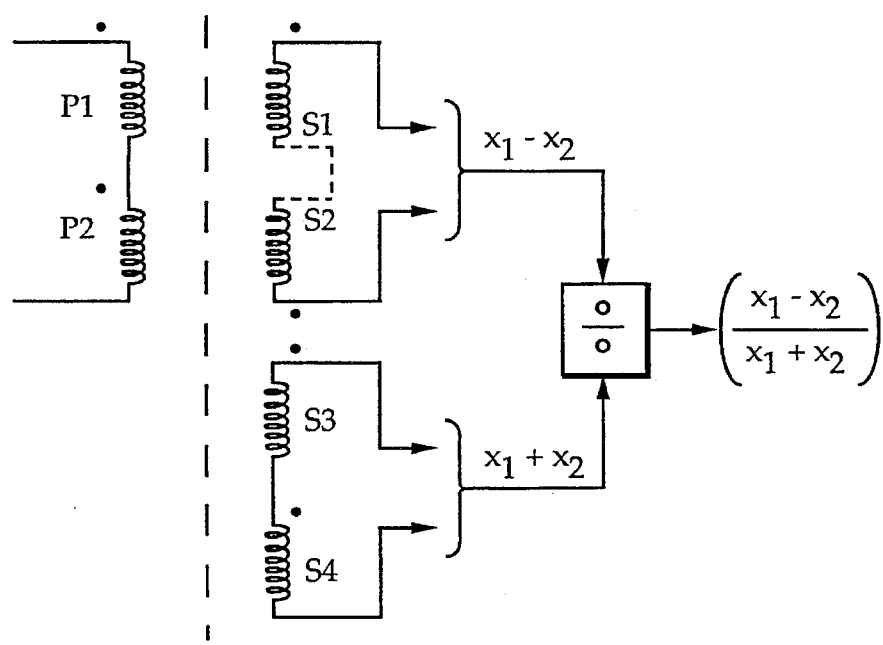
FIG. 25 shows a way to obtain both the flux difference and the flux sum being indicative of the differential and sum distances being divided to eliminate scale factor problems due to varying distance between rails, according to the invention.
Figure 26:
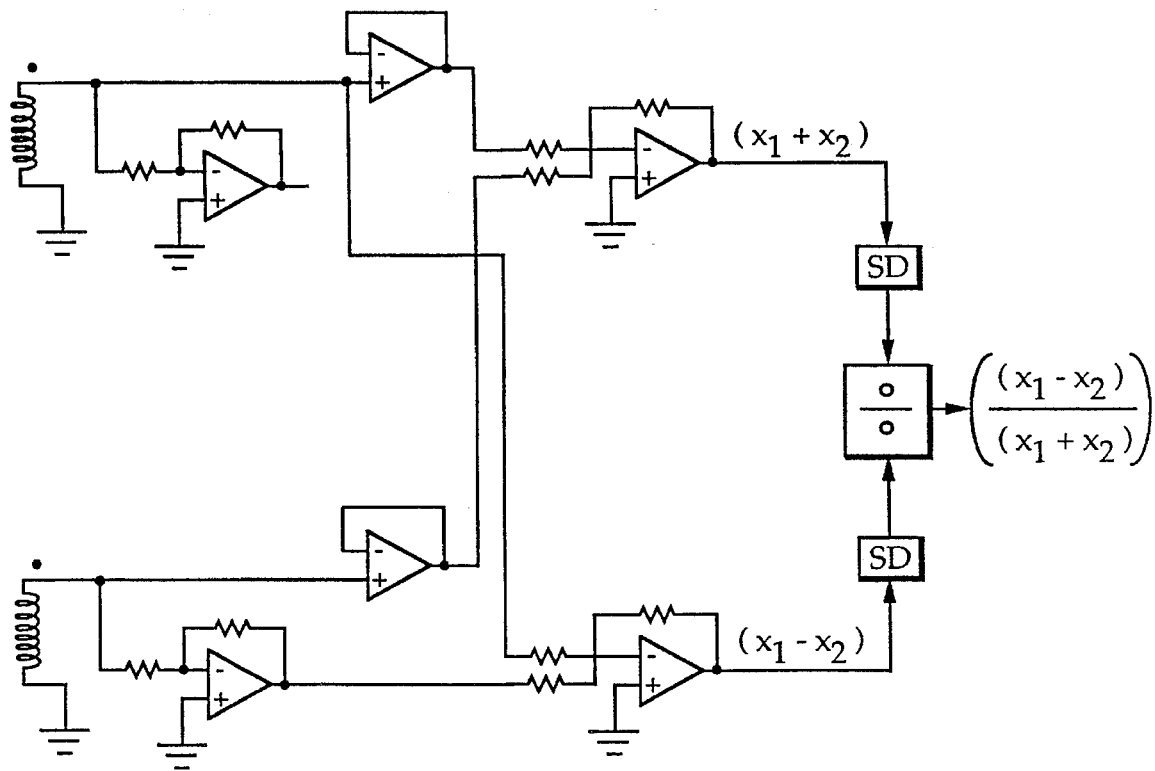
FIG. 26 is similar to FIG. 25, except using a single coil and obtaining the sum and difference fluxes using a plurality of op amps, according to the invention.

The sum and difference signals can be obtained using separate secondary coils, as shown in FIG. 25, or using a single set of secondary coils connected to a plurality of op amps, as shown in FIG. 26. The resulting sum (x1+x2) and difference (x1−x2) signals are passed through synchronous detectors (SD). The difference signal is then divided by the sum signal to provide the ratiometric signal described above. This division can be done in a computer, or using an analog multiplier connected in a divide mode, such as shown in FIG. 27.

One problem with this approach is that the needed range exceeds the ±5 mm linear range described above, and the more complicated signal processing technique of FIG. 10B is required.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A contactless position sensor, comprising:

a first magnetic flux source at a distance g from a referent, for providing magnetic flux alone an axis;

a second magnetic flux source for providing additional magnetic flux along said axis, at a same distance g from said referent as said first magnetic flux source but in an opposite direction;

an object, located between said first and second flux sources at a varying position x having a positive or negative sense relative to said same referent, responsive to said magnetic flux from both said first and second magnetic flux sources;

a sensing means, responsive to said magnetic flux from both said first magnetic flux source and said second magnetic flux source, for providing a sensed signal $V_{OUT}$ depending on said varying position x; and signal processing means, responsive to said sensed signal $V_{OUT}$, for providing a position signal indicative of said varying position x, wherein said said first magnetic flux source and said second magnetic flux source each comprise a driven coil wound on a respective first core and a second core for excitation by a sinusoidal electrical source for providing said magnetic flux, and wherein said sensing means comprises a first sensing coil and a second sensing coil respectively wound on said first core and said second core, thereby providing that said first sensing coil and second sensing coil remain fixed relative to said first driven coil and second driven coil respectively, and wherein said sensed signal $V_{OUT}$ is indicative of said object at said varying position x relative to said first magnetic flux source and said second magnetic flux source according to a relation $1/(g+x)-1/(g-x)$.

2. The sensor of claim 1, wherein said object and said second magnetic flux source move together, maintaining a fixed separation therebetween.

3. The sensor of claim 1, wherein said signal processing means comprises:

first summing means, responsive to said sensed signal and to a first constant signal, for providing a first summed signal;

divider means, responsive to said first summed signal and to a second constant signal, for providing a quotient signal; and second summing means, responsive to said quotient signal and to a third constant signal, for providing said position signal.

4. The sensor of claim 1, wherein said signal processing means is responsive to said sensed signal $V_{OUT}$, to a signal indicative of said same distance g, and to a constant signal K, for providing said position signal according to a relation $$\frac{-2K \pm \sqrt{(2K)^2 - 4V_{OUT}^2 g^2}}{2V_{OUT}}.$$

5. The sensor of claim 1, wherein said first core and said second core are each a pot core.

6. The sensor of claim 1, wherein said first core and said second core are selected from the group consisting of E-shaped cores and pot cores.

7. The sensor of claim 6, wherein said first core and said second core each have dimensions of about 2 cm×4 cm×2 cm.

8. The sensor of claim 5, wherein said first core and said second core each have a diameter of about 2.5 cm and a height of about 0.8 cm.

9. The sensor of claim 1, wherein said sensed signal $V_{OUT}$ comprises separate component signals and wherein said sensor further comprises a divider, responsive to a sum of said separate component signals and to a difference of said separate component signals, for providing a quotient signal.

* * * * *